(12) United States Patent
Gotanda

(10) Patent No.: US 10,970,799 B2
(45) Date of Patent: Apr. 6, 2021

(54) DISTRIBUTED ORDERING SCHEME IN ORDER MANAGEMENT SYSTEM

(71) Applicant: TOSHIBA TEC KABUSHIKI KAISHA, Tokyo (JP)

(72) Inventor: Tsuyoshi Gotanda, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 264 days.

(21) Appl. No.: 16/251,794

(22) Filed: Jan. 18, 2019

(65) Prior Publication Data

US 2019/0228483 A1   Jul. 25, 2019

(30) Foreign Application Priority Data

Jan. 19, 2018 (JP) .............................. JP2018-007087

(51) Int. Cl.
*G06Q 50/12* (2012.01)
*G06Q 10/02* (2012.01)
*G06Q 20/20* (2012.01)
*G06F 3/0481* (2013.01)
*H04W 4/80* (2018.01)

(52) U.S. Cl.
CPC .............. *G06Q 50/12* (2013.01); *G06Q 10/02* (2013.01); *G06Q 20/20* (2013.01); *G06F 3/04817* (2013.01); *H04W 4/80* (2018.02)

(58) Field of Classification Search
CPC ........ G06Q 50/12; G06Q 10/02; G06Q 20/20; G06Q 20/202; G06F 3/04817; H04W 4/80; G07G 1/00
See application file for complete search history.

(56) References Cited

U.S. PATENT DOCUMENTS

| | | | | |
|---|---|---|---|---|
| 5,573,082 A * | 11/1996 | Conlan | ................ | G06Q 10/087 186/44 |
| 6,102,162 A * | 8/2000 | Teicher | ............... | G07F 17/0042 186/39 |
| 6,415,555 B1 * | 7/2002 | Montague | .............. | G06Q 30/06 235/375 |
| D580,678 S * | 11/2008 | Ruffing | ......................... | D6/698 |

(Continued)

FOREIGN PATENT DOCUMENTS

| JP | 2000207469 A | * | 7/2000 |
|---|---|---|---|
| JP | 2005202910 A | * | 7/2005 |

(Continued)

*Primary Examiner* — Ashford S Hayles
(74) *Attorney, Agent, or Firm* — Kim & Stewart LLP

(57) ABSTRACT

An order management system includes an ordering terminal, a checkout terminal, a server, and a kitchen terminal. The ordering terminal generates and transmits order data, a seat leaving command and a seat ID, in response to user inputs. The checkout terminal is configured to process payment for the order. The server is configured to: generate an order file including an order ID based on the order data, transmit checkout data including data in the order file to the checkout terminal, in response to the order ID from the checkout terminal, transmit seat data for seat selection, in response to payment completion data associated with the order ID, transmit a cook start command in response to assignment of one or more vacant seats associated with the order ID, and update the seat data based on the seat leaving command and the seat ID received from the ordering terminal.

20 Claims, 15 Drawing Sheets

(56) References Cited

U.S. PATENT DOCUMENTS

| | | | | |
|---|---|---|---|---|
| 7,711,600 | B1* | 5/2010 | Curran | G06Q 30/00 705/16 |
| 8,190,483 | B2* | 5/2012 | Woycik | G07F 9/002 705/26.1 |
| 8,301,301 | B2* | 10/2012 | Edwards | G07F 9/026 700/241 |
| 8,799,083 | B1* | 8/2014 | Silver | G06Q 50/12 705/15 |
| 10,068,273 | B2* | 9/2018 | Frehn | G07F 17/0078 |
| 10,585,496 | B2* | 3/2020 | Jeon | G06F 3/0482 |
| 10,664,826 | B2* | 5/2020 | Hong | G06Q 20/102 |
| 2002/0052790 | A1* | 5/2002 | Tomishima | G06Q 10/06 705/15 |
| 2002/0178024 | A1* | 11/2002 | Terakoshi | G06Q 30/0284 705/15 |
| 2003/0046166 | A1* | 3/2003 | Liebman | G06Q 50/12 705/15 |
| 2003/0083919 | A1* | 5/2003 | Hammann | G06Q 30/08 705/7.25 |
| 2003/0158624 | A1* | 8/2003 | Kimura | G06Q 20/047 700/233 |
| 2003/0210277 | A1* | 11/2003 | Harada | G06Q 30/02 715/810 |
| 2004/0080399 | A1* | 4/2004 | Foster | G06Q 30/02 340/286.09 |
| 2004/0138929 | A1* | 7/2004 | Awiszus | G06Q 10/02 705/5 |
| 2004/0158499 | A1* | 8/2004 | Dev | G06Q 30/02 705/26.1 |
| 2004/0210621 | A1* | 10/2004 | Antonellis | G06Q 10/087 709/200 |
| 2005/0059414 | A1* | 3/2005 | Mahmoodi | G06Q 30/02 455/456.2 |
| 2005/0086117 | A1* | 4/2005 | Kanisawa | G06Q 50/12 705/7.36 |
| 2005/0182681 | A1* | 8/2005 | Bruskotter | G07F 17/40 705/15 |
| 2006/0143087 | A1* | 6/2006 | Tripp | G06Q 50/12 705/15 |
| 2006/0186197 | A1* | 8/2006 | Rosenberg | G06Q 50/12 235/380 |
| 2007/0073586 | A1* | 3/2007 | Dev | G06Q 30/0601 705/14.25 |
| 2008/0201241 | A1* | 8/2008 | Pecoraro | G06Q 30/0621 705/26.8 |
| 2008/0313046 | A1* | 12/2008 | Denenburg | G06Q 20/20 705/15 |
| 2009/0281903 | A1* | 11/2009 | Blatstein | G06Q 30/0641 705/15 |
| 2010/0262507 | A1* | 10/2010 | Woycik | G06Q 10/00 705/26.1 |
| 2011/0054955 | A1* | 3/2011 | Nasrallah | G06Q 20/20 705/5 |
| 2011/0218867 | A1* | 9/2011 | Cerrato | G06Q 50/12 705/15 |
| 2012/0206237 | A1* | 8/2012 | Lovegreen | G06Q 50/12 340/10.1 |
| 2013/0138515 | A1* | 5/2013 | Taniguchi | G06Q 10/087 705/15 |
| 2013/0311310 | A1* | 11/2013 | Zell | G06Q 30/0643 705/15 |
| 2014/0114807 | A1* | 4/2014 | Baker | G06Q 30/0617 705/26.41 |
| 2014/0122148 | A1* | 5/2014 | Padgett | G06Q 50/12 705/7.15 |
| 2014/0122170 | A1* | 5/2014 | Padgett | G06Q 10/0631 705/7.29 |
| 2014/0122263 | A1* | 5/2014 | Padgett | G06Q 10/063 705/15 |
| 2014/0343976 | A1* | 11/2014 | Ahluwalia | G06Q 10/02 705/5 |
| 2015/0012307 | A1* | 1/2015 | Moss | G06Q 10/02 705/5 |
| 2015/0039450 | A1* | 2/2015 | Hernblad | G06Q 20/322 705/15 |
| 2015/0187027 | A1* | 7/2015 | Lowe | G06Q 10/0633 705/15 |
| 2016/0042441 | A1* | 2/2016 | Tajiri | G06Q 20/405 705/26.82 |
| 2016/0048776 | A1* | 2/2016 | Azuma | G06Q 10/02 705/5 |
| 2016/0275597 | A1* | 9/2016 | Ueda | G06Q 30/0635 |
| 2016/0275631 | A1* | 9/2016 | Serizawa | G06Q 50/12 |
| 2016/0283867 | A1* | 9/2016 | Sasaki | G06Q 10/02 |
| 2017/0018040 | A1* | 1/2017 | Sasahara | G06Q 30/06 |
| 2017/0039559 | A1* | 2/2017 | Frieden | G06Q 20/382 |
| 2017/0055752 | A1* | 3/2017 | Mueller | G06Q 30/0641 |
| 2017/0103374 | A1* | 4/2017 | Bhattacharjee | G06Q 20/32 |
| 2017/0124545 | A1* | 5/2017 | Xie | G06Q 50/12 |
| 2017/0222868 | A1* | 8/2017 | Tan | H04L 41/0668 |
| 2017/0323375 | A1* | 11/2017 | Slater | A61B 5/0484 |
| 2017/0345043 | A1* | 11/2017 | Mayo | G06Q 30/0226 |
| 2018/0082234 | A1* | 3/2018 | Burt | G06Q 30/0635 |
| 2018/0276770 | A1* | 9/2018 | Cronin | G06K 9/00771 |
| 2019/0057325 | A1* | 2/2019 | Ishii | G06Q 10/04 |
| 2019/0102830 | A1* | 4/2019 | Yin | G06F 3/04883 |
| 2019/0213506 | A1* | 7/2019 | Greenberger | H04L 67/22 |

FOREIGN PATENT DOCUMENTS

| | | | |
|---|---|---|---|
| JP | 3774256 | B2 * | 5/2006 |
| JP | 2011-054128 | A | 3/2011 |
| JP | 5574856 | B2 * | 8/2014 |
| JP | 6492248 | B2 * | 4/2019 |
| KR | 20110111983 | A * | 10/2011 |

* cited by examiner

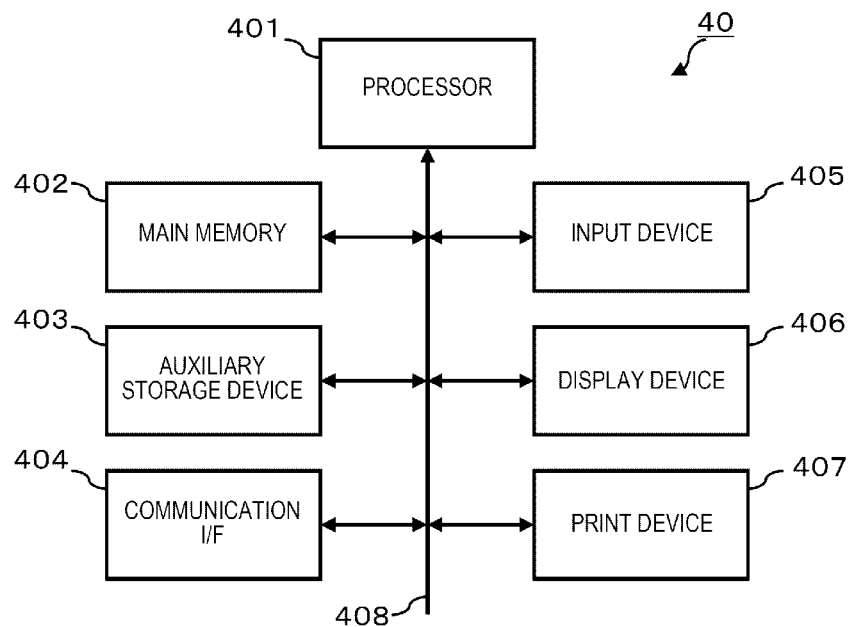

FIG. 20

★ CONTENT OF ORDER ★

| MENU A | ONE | 600 YEN |
| MENU B | ONE | 400 YEN |

| TOTAL | TWO | 1000 YEN |

IN CASE OF ADDITIONAL ORDER — ADD (B2)

IN CASE WHERE ORDER IS CONFIRMED — ORDER CONFIRMATION (B3)

★ PAYMENT RECEPTION ★

AMOUNT OF PAYMENT     1000 YEN

PLEASE SELECT PAYMENT METHOD

B4 — CASH     ELECTRONIC MONEY — B5

SC3, T4

DISTRIBUTED ORDERING SCHEME IN ORDER MANAGEMENT SYSTEM

CROSS-REFERENCE TO RELATED APPLICATION

This application is based upon and claims the benefit of priority from Japanese Patent Application No. 2018-007087, filed in Jan. 19, 2018, the entire contents of which are incorporated herein by reference.

FIELD

Embodiments described herein relate generally to an order management system, an order management apparatus, and an order management method.

BACKGROUND

In a restaurant, a self-service system is introduced to provide service with fewer staff. For example, a ticket vending machine for a meal ticket is introduced. By using the ticket vending machine, a guest can make an order and complete checkout, and thus staff for taking order and checkout may not be necessary. However, since the order is completed when the guest completes the checkout, there may be less chance of obtaining an additional order.

Another type of a self-service checkout machine is introduced. According to the self-service checkout machine, the guest performs checkout after service of food. However, this self-service checkout machine may involve a risk of dine and dash.

DESCRIPTION OF THE DRAWINGS

FIG. 6 is a block diagram illustrating a configuration of a kitchen terminal.

FIG. 7 is a schematic diagram illustrating a configuration of a cooking management table.

FIG. 20 is a diagram illustrating an example of an order check screen.

FIG. 21 is a diagram illustrating an example of a payment reception screen.

DETAILED DESCRIPTION

An embodiment is directed to providing an order management system, an order management apparatus, and an order management method, to provide service in a restaurant with fewer personnel.

According to an embodiment, an order management system includes an ordering terminal, a checkout terminal, a server, and a kitchen terminal. The ordering terminal generates and transmits order data, a seat leaving command and a seat ID, in response to user inputs. The checkout terminal is configured to process payment for the order. The server is configured to: generate an order file including an order ID based on the order data transmitted from the ordering terminal, transmit checkout data including data in the order file to the checkout terminal over the network, in response to the order ID received from the checkout terminal, transmit seat data indicating a vacant seat status for seat selection over the network, in response to payment completion data associated with the order ID from the checkout terminal, transmit a cook start command for the order over the network, in response to assignment of one or more vacant seats to one or more customers associated with the order ID, and update the seat data based on the seat leaving command and the seat ID received from the ordering terminal. The kitchen terminal is configured to generate a cook start notification for the order based on the cook start command received from the server.

Hereinafter, the embodiment of the order management system which is capable of achieving the effective self-service ordering in a restaurant will be described with reference to the accompanying drawings.

Figure 1:
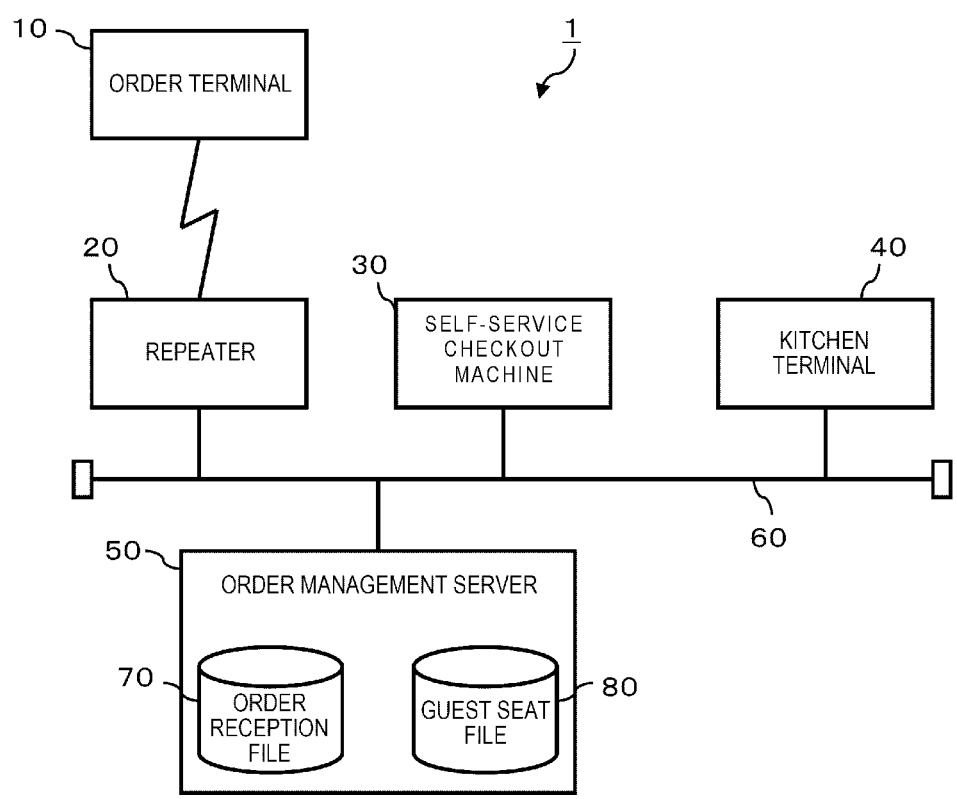
FIG. 1 is a block diagram illustrating a schematic configuration of an order management system according to an embodiment.

FIG. 1 is a block diagram illustrating a schematic configuration of an order management system 1 according to an embodiment. It is assumed that the order management system 1 according to the embodiment is provided in a restaurant. In the restaurant, staff are classified into a hospitality part and a cooking part. Furthermore, the staff of the hospitality part performs an order reception work, a catering work, a seat clearance, and the like. The staff of the cooking part performs cooking of a menu item. In contrast, if a guest ends an order of the menu item, the guest performs a checkout in a self-service form. Furthermore, after the checkout, the guest takes a seat, eats cooked meals, and leaves the restaurant after eating.

In order to handle the restaurant in such a form, the order management system 1 includes an order terminal 10, a repeater 20, a self-service checkout machine 30, a kitchen terminal 40, an order management server 50, and a network 60. The network 60 connects the order management server 50, the repeater 20, the self-service checkout machine 30, and the kitchen terminal 40. The network 60 is, for example, a wired or wireless Local Area Network (LAN).

Typically, the order terminal 10 is an electronic machine which is operated by the staff in the hospitality part. However, depending on a situation, the guest may become an operator of the order terminal 10. The order terminal 10 may be a handy type or may be a stationary type. In the embodiment, a handy-type electronic machine is illustrated as the order terminal 10. The order terminal 10 is provided to input data relevant to the order of the guest. In addition, the order terminal 10 is provided to input data relevant to a seat which is ready to be seated (cleaned up). The data, which is input to the order terminal 10, is wirelessly transmitted to the repeater 20.

The repeater 20 performs data communication with the order terminal 10 using a prescribed wireless communication method. The repeater 20 receives the data transmitted from the order terminal 10, and transmits the data to the order management server 50 through the network 60.

Typically, the self-service checkout machine 30 is an checkout machine operated by the guest who ends the order of the menu item. However, depending on a situation, there may be a case where the staff operates the self-service checkout machine 30. The self-service checkout machine 30 is provided for payment of the menu item which is ordered by the guest. A payment method is not particularly limited. For example, payment using cash, payment using a credit card, payment using electronic money, and the like may be used. In addition, payment corresponding to a plurality of payment methods may be used. In the embodiment, the self-service checkout machine 30, which is capable of selecting the payment using the cash and the payment using the electronic money, is illustrated.

The kitchen terminal 40 is an electronic machine which is located in a kitchen in order to notify the menu item, the order of which is received from the guest, to the cooking staff. The kitchen terminal 40 provides a notification to the staff by outputting information relevant to the menu item, the order of which is received from the guest. Alternatively, the kitchen terminal 40 provides the notification to the staff, by printing out, for example, the information relevant to the menu item, the order of which is received from the guest. In the embodiment, the kitchen terminal 40 in a type, in which the information relevant to the menu item is displayed and output, is illustrated.

The order management server 50 is a computer apparatus which integrally controls operations of the order terminal 10, the self-service checkout machine 30, and the kitchen terminal 40. That is, the order management server 50 controls a menu item order reception work which is performed through the order terminal 10. In addition, the order management server 50 controls a checkout work performed through the self-service checkout machine 30. In addition, the order management server 50 controls a cooking instruction work performed through the kitchen terminal 40.

In FIG. 1, the order terminal 10, the repeater 20, the self-service checkout machine 30, and the kitchen terminal 40 are each provided one. However, the order terminal 10, the repeater 20, the self-service checkout machine 30, and the kitchen terminal 40 may be provided two or more, each, by taking a size of a store, a layout, or the like into consideration.

Furthermore, the order management server 50 includes an order reception file 70 and a guest seat file 80. The order reception file 70 is a data file used to store an order reception record 70R (see FIG. 2) which is generated for each guest. The guest seat file 80 is a data file used to store a guest seat record 80R (see FIG. 3) which is generated for each seat disposed in the store.

Figure 2:
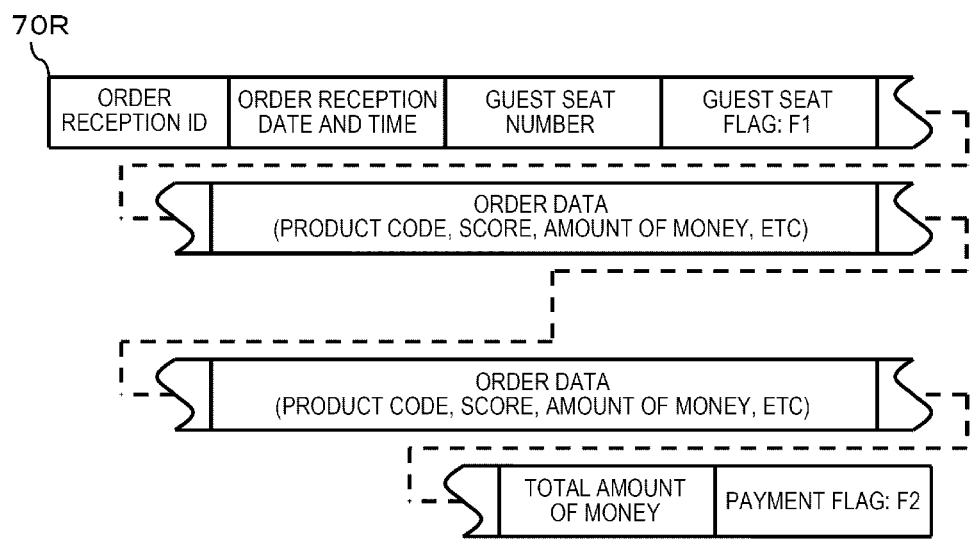
FIG. 2 is a schematic diagram illustrating a major data structure of an order reception record in an order reception file.

FIG. 2 is a schematic diagram illustrating a data structure of the order reception record 70R. As illustrated in FIG. 2, the order reception record 70R includes items such an order reception ID, an order reception date and time, a guest seat number, a guest seat flag F1, order data, the total amount of money, and a payment flag F2. The order reception ID is identification information which is automatically issued if the order reception record 70R is generated in order to individually identify the order reception record 70R. The order reception date and time indicates a date and time at which the order reception record 70R is generated. The guest seat number is identification information which is assigned for each seat in order to individually identify the seat (a table seat, a counter seat, or the like) which is seated by the guest. The guest seat flag F1 is 2-bit information that is set to "0" in an initial state, in which the seat is not confirmed, and that is set to "1" if the seat is confirmed. The order data includes a commodity code, a score, the amount of money, and the like of the menu item which is ordered by the guest. If the guest orders two or more items, respective order data are included in the order reception record 70R. The total amount of money is the total amount of money of the menu items ordered by the guest. The payment flag F2 is 2-bit information that is set to "0" in an initial state before the payment with respect to the total amount of money is completed, and that is set to "1" if the payment is completed.

Figure 3:
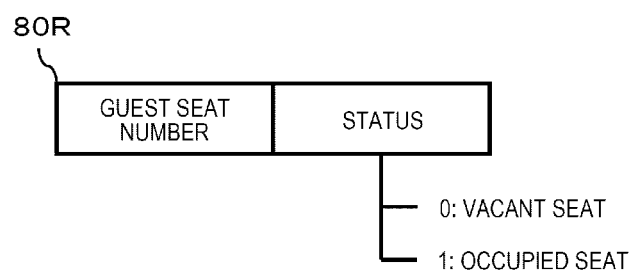
FIG. 3 is a schematic diagram illustrating a data structure of a seat record in a guest seat file.

FIG. 3 is a schematic diagram illustrating a data structure of the guest seat record 80R. As illustrated in FIG. 3, the guest seat record 80R includes a guest seat number and a status. The status is information indicative of a state of the seat identified by a relevant guest seat number. The state of the seat includes a vacant seat and an occupied seat. In the embodiment, in a case of the vacant seat, the status is set to "0". In a case of the occupied seat, the status is set to "1". The state of the seat is not limited to the vacant seat and the occupied seat. For example, an unusable state may be added.

Figure 4:
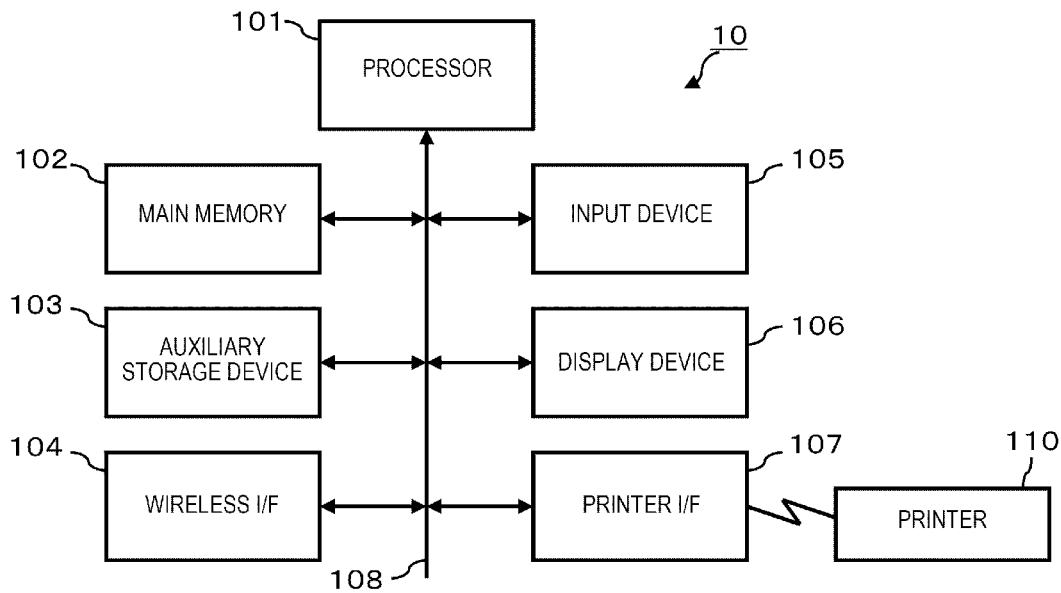
FIG. 4 is a block diagram illustrating a configuration of an order terminal.

FIG. 4 is a block diagram illustrating a configuration of the order terminal 10. The order terminal 10 includes a processor 101, a main memory 102, an auxiliary storage device 103, a wireless interface (I/F) 104, an input device 105, a display device 106, a printer interface 107, and a system bus 108. Furthermore, in the order terminal 10, the processor 101, the main memory 102, the auxiliary storage device 103, the wireless interface 104, the input device 105, the display device 106, and the printer interface 107 are electrically connected to the system bus 108 directly or through a signal input/output circuit.

The order terminal 10 is a computer including the processor 101, the main memory 102, the auxiliary storage device 103, and the system bus 108 which connects the processor 101, the main memory 102, and the auxiliary storage device 103.

The processor 101 corresponds to a central part of the computer. The processor 101 controls respective units according to an operating system and an application program in order to perform various functions as the order terminal 10.

The main memory 102 corresponds to main storage of the computer. The main memory 102 includes a non-volatile memory area and a volatile memory area. The main memory 102 stores the operating system and the application program in the non-volatile memory area. In addition, there is a case where the main memory 102 stores data, which is necessary to perform a process used for the processor 101 to control the respective units, in the non-volatile memory area or the volatile memory area. The main memory 102 uses the volatile memory area as a work area in which the data is appropriately rewritten by the processor 101.

The auxiliary storage device 103 corresponds to auxiliary storage of the computer. For example, an Electric Erasable Programmable Read-Only Memory (EEPROM), a Hard Disc Drive (HDD), a Solid State Drive (SSD), or the like is used as the auxiliary storage device 103. The auxiliary storage device 103 stores data, which is used when the processor 101 performs various processes, or data which is generated according to the process performed in the processor 101. There is a case where the auxiliary storage device 103 stores the application program.

The wireless interface 104 is an interface which is used to wirelessly transmit and receive the data. The specification (standard) of the interface may not be limited particularly. The order terminal 10 performs wireless communication with the repeater 20 through the wireless interface 104.

The input device 105 is a device which functions as an interface which is used to input the data into the order terminal 10. For example, a keyboard, a mouse, a touch panel, or the like is used as the input device. The order terminal 10 receives input, such as the commodity code or the order score of the menu item ordered by the guest, through the input device 105.

The display device 106 is a device which is used to display various pieces of information under the control of the processor 101. For example, a liquid crystal display (LCD), an Electroluminescence (EL) display, or the like is used as the display device 106. The order terminal 10 causes the display device 106 to display a name, a price, or the like of the menu item, the input of which is received through the input device 105.

The printer interface 107 is an interface which is used to supply print data to the printer 110. The printer interface 107 may supply the print data to the printer 110 in a wired manner or may supply the print data in a wireless manner such as Wi-Fi®. The printer 110 is provided to print an order slip P1 (see FIG. 18). The order slip P1 will be described below. For example, a thermal printer, an ink jet printer, or the like is used as the printer 110.

For the order terminal 10 having the above-described configuration, it is possible to use a handy terminal, a tablet terminal, or the like of the order management system which is already introduced in a family restaurant, a bar, or the like. Otherwise, it is possible to utilize the electronic machine as the order terminal 10 by installing a dedicated application program in an electronic machine such as a smart phone. Here, it is possible for the guest to personally operate the smart phone and to input data of the menu item to be ordered.

Figure 5:
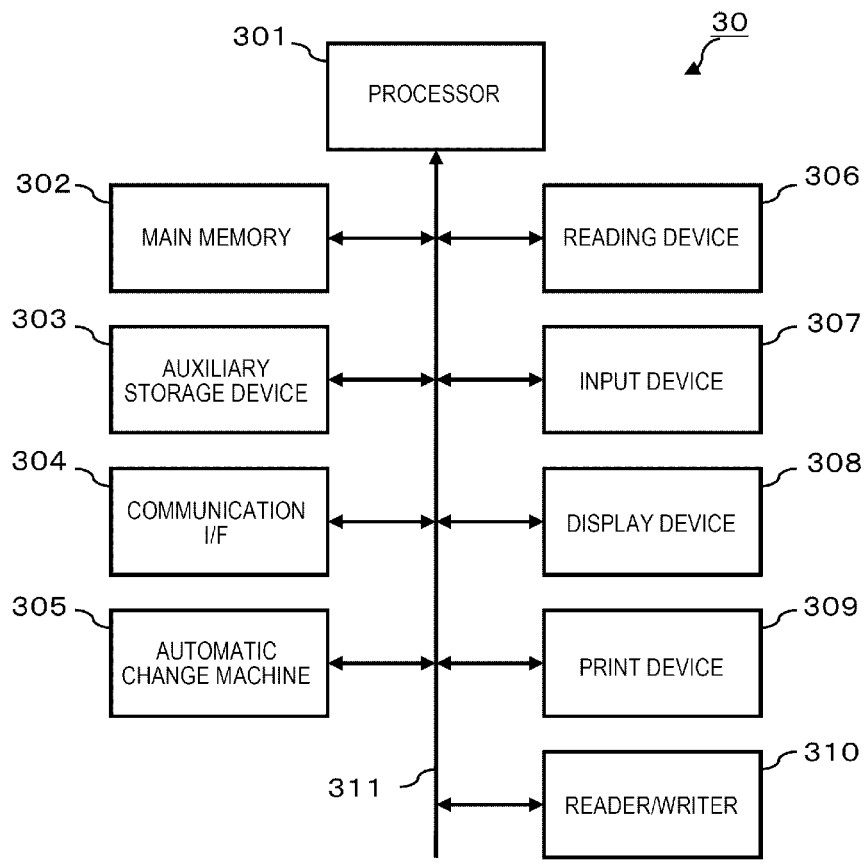
FIG. 5 is a block diagram illustrating a configuration of a self-service checkout machine.

FIG. 5 is a block diagram illustrating an essential circuit configuration of the self-service checkout machine 30. The self-service checkout machine 30 includes a processor 301, a main memory 302, an auxiliary storage device 303, a communication interface 304, an automatic change machine 305, a reading device 306, an input device 307, a display device 308, a print device 309, a reader/writer 310, and a system bus 311. Furthermore, in the self-service checkout machine 30, the processor 301, the main memory 302, the auxiliary storage device 303, the communication interface 304, the automatic change machine 305, the reading device 306, the input device 307, the display device 308, the print device 309, and the reader/writer 310 are electrically connected to the system bus 311 directly or through the signal input/output circuit.

The self-service checkout machine 30 is a computer including the processor 301, the main memory 302, the auxiliary storage device 303, and the system bus 311 which connects the computer using the processor 301, the main memory 302, and the auxiliary storage device 303. The processor 301 corresponds to the central part of the computer. The processor 301 controls the respective units according to the operating system and the application program in order to perform various functions as the self-service checkout machine 30.

The main memory 302 corresponds to main storage of the computer. The main memory 302 includes the non-volatile memory area and the volatile memory area. The main memory 302 stores the operating system and the application program in the non-volatile memory area. In addition, there is a case where the main memory 302 stores data, which is necessary for the processor 301 to perform a process of controlling the respective units, in the non-volatile memory area or the volatile memory area. The main memory 302 uses the volatile memory area as the work area in which the data is appropriately rewritten by the processor 301.

The auxiliary storage device 303 corresponds to auxiliary storage of the computer. For example, the EEPROM, the HDD, the SSD, or the like is used as the auxiliary storage device 303. The auxiliary storage device 303 stores data, which is used when the processor 301 performs various processes, or data which is generated according to the process performed in the processor 301. There is a case where the auxiliary storage device 303 stores the application program.

The communication interface 304 is an interface which is used to transmit and receive the data using the network 60. The specification (standard) of the interface may not be limited particularly. The self-service checkout machine 30 performs data communication with the order management server 50 through the communication interface 304.

The automatic change machine 305 includes a cash feeding port and a cash payment port. The automatic change machine 305 counts the amount of bills or coins, which are inserted from the cash feeding port, and, if the inserted amount exceeds the amount of settlement money, dispenses the difference as a change from the cash payment port. The amount of settlement is the amount which is necessary to pay off the price of the menu item ordered by the guest.

The reading device 306 is a device which has a function of scanning and reading a code symbol such as a barcode or 2-dimensional data code.

The input device 307 is a device which functions as an interface used to input the data to the self-service checkout machine 30. For example, the keyboard, the mouse, the touch panel, or the like is used as the input device. The self-service checkout machine 30 receives input, such as the commodity code or the order score of the menu item additionally ordered by the guest, through the input device 307.

The display device 308 is a device which is used to display various pieces of information under the control of the processor 301. For example, the LCD, the EL display, or the like is used as the display device 308. The self-service checkout machine 30 causes the display device 308 to display a list, the amount of settlement, and the like of the menu items ordered by the guest.

The print device 309 is a device which is used to print a receipt. For example, the thermal printer, the ink jet printer, or the like is used as the print device 309.

The reader/writer 310 is a device which is used to read data stored in a recording medium and to write the data into the recording medium. In the embodiment, an IC card, the smart phone, or the like, which stores data that is necessary for payment of the electronic money and which has a short-distance wireless communication function, is used as the recording medium.

For the self-service checkout machine 30 having the above-described configuration, it is possible to use a self-type or semi self-service-type Point Of Sales (POS) terminal which is already introduced in a supermarket, a convenience store, or the like.

FIG. 6 is a block diagram illustrating a configuration of the kitchen terminal 40. The kitchen terminal 40 includes a processor 401, a main memory 402, an auxiliary storage device 403, a communication interface 404, an input device 405, a display device 406, a print device 407, and a system bus 408. Furthermore, in the kitchen terminal 40, the processor 401, the main memory 402, the auxiliary storage device 403, the communication interface 404, the input device 405, the display device 406, and the print device 407 are electrically connected to the system bus 408 directly or through the signal input/output circuit.

The kitchen terminal 40 is a computer including the processor 401, the main memory 402, the auxiliary storage device 403, and the system bus 408 which connects the processor 401, the main memory 402, and the auxiliary storage device 403. The processor 401 corresponds to the central part of the computer. The processor 401 controls the respective units according to the operating system and the application program in order to perform various functions as the kitchen terminal 40.

The main memory 402 corresponds to main storage of the computer. The main memory 402 includes the non-volatile memory area and the volatile memory area. The main memory 402 stores the operating system and the application program in the non-volatile memory area. In addition, there is a case where the main memory 402 stores data, which is necessary to perform a process used for the processor 401 to control the respective units, in the non-volatile memory area or the volatile memory area. The main memory 402 uses the volatile memory area as the work area in which the data is appropriately rewritten by the processor 401.

The auxiliary storage device 403 corresponds to auxiliary storage of the computer. For example, the EEPROM, the HDD, the SSD, or the like is used as the auxiliary storage device 403. The auxiliary storage device 403 stores data, which is used when the processor 401 performs various processes, or data which is generated according to the process performed in the processor 401. There is a case where the auxiliary storage device 403 stores the application program.

The communication interface 404 is an interface which is used to transmit and receive the data using the network 60. The specification (standard) of the interface may not be limited particularly. The kitchen terminal 40 performs data communication with the order management server 50 through the communication interface 404.

The input device 405 is a device which functions as an interface used to input the data to the kitchen terminal 40. For example, the keyboard, the mouse, the touch panel, or the like is used as the input device. The kitchen terminal 40 receives input of data of the menu item, the cooking of which ends, through the input device 405.

The display device 406 is a device which is used to display various pieces of information under the control of the processor 401. For example, the LCD, the EL display, or the like is used as the display device 406. The kitchen terminal 40 causes the display device 406 to display, for example, an item name of the menu item ordered from the guest or a cooking instruction screen illustrating an icon which is associated with the number times that cooking is performed.

The print device 407 is a device which is used to print a catering slip. The catering slip is a slip, in which information indicative of a catering destination of the cooked commodity, is recorded. For example, the thermal printer, the ink jet printer, or the like is used as the print device 407.

The kitchen terminal 40 having the configuration forms a cooking management table 90 (see FIG. 7) in a volatile area of the main memory 402. FIG. 7 is a schematic diagram illustrating a configuration of the cooking management table 90. The cooking management table 90 includes fields corresponding to the order reception ID, the commodity code, the order reception date and time, the guest seat number, a cooking start flag F3, and a cooking end flag F4. The cooking start flag F3 is 2-bit information which is in the initial state "0" until a cooking start instruction of the menu item specified by the order reception ID and the commodity code on the same line is provided, and which is set to "1" if the cooking start instruction is provided. The cooking end flag F4 is 2-bit information which is in the initial state "0" until a cooking end instruction of the menu item specified by the order reception ID and the commodity code on the same line is provided, and which is set to "1" if the cooking end instruction is provided.

For the kitchen terminal 40 having the above-described configuration, it is possible to use the kitchen terminal of the order management system which is already introduced in the family restaurant, the bar, or the like.

Figure 8:
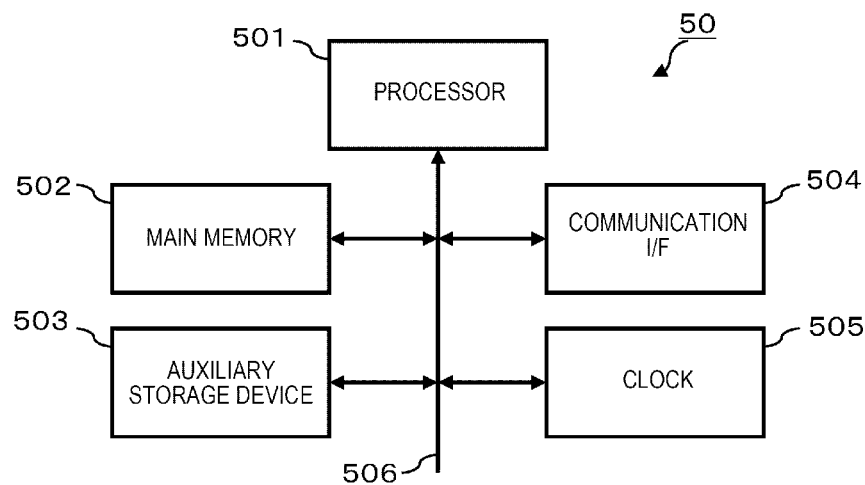
FIG. 8 is a block diagram illustrating a configuration of an order management server.

FIG. 8 is a block diagram illustrating a configuration of the order management server 50. The order management server 50 includes a processor 501, a main memory 502, an auxiliary storage device 503, a communication interface 504, a clock 505, and a system bus 506. Furthermore, in the order management server 50, the processor 501, the main memory 502, the auxiliary storage device 503, the communication interface 504, and the clock 505 are electrically connected to the system bus 506 directly or through the signal input/output circuit.

The order management server 50 is a computer including the processor 501, the main memory 502, the auxiliary storage device 503, and the system bus 506 which connects the processor 501, the main memory 502, and the auxiliary storage device 503. The processor 501 corresponds to the central part of the computer. The processor 501 controls the respective units according to the operating system and the application program in order to realize various functions as the order management server 50.

The main memory 502 corresponds to main storage of the computer. The main memory 502 includes the non-volatile memory area and the volatile memory area. The main memory 502 stores the operating system and the application program in the non-volatile memory area. In addition, there is a case where the main memory 502 stores data, which is necessary to perform a process used for the processor 501 to control the respective units, in the non-volatile memory area or the volatile memory area. The main memory 502 uses the volatile memory area as the work area in which the data is appropriately rewritten by the processor 501.

The auxiliary storage device 503 corresponds to auxiliary storage of the computer. For example, the EEPROM, the HDD, the SSD, or the like is used as the auxiliary storage device 503. The auxiliary storage device 503 stores data, which is used when the processor 501 performs various processes, or data which is generated according to the process performed in the processor 501. There is a case where the auxiliary storage device 503 stores the application program.

The communication interface 504 is an interface which is used to transmit and receive the data using the network 60. The specification (standard) of the interface may not be limited particularly. The order management server 50 performs data communication with the repeater 20, the self-service checkout machine 30, and the kitchen terminal 40 through the communication interface 504.

The clock 505 functions as a time information source of the order management server 50. The processor 501 clocks current date and time based on time information clocked by the clock 505.

Figure 9:
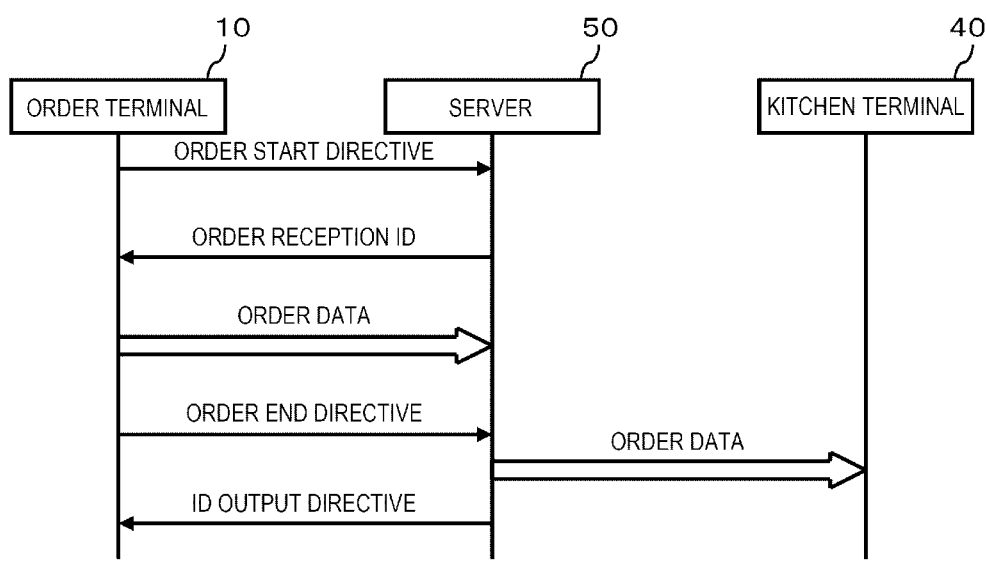
FIG. 9 is a diagram illustrating an example of a communication sequence among the order terminal, the order management server, and the kitchen terminal.
Figure 10:
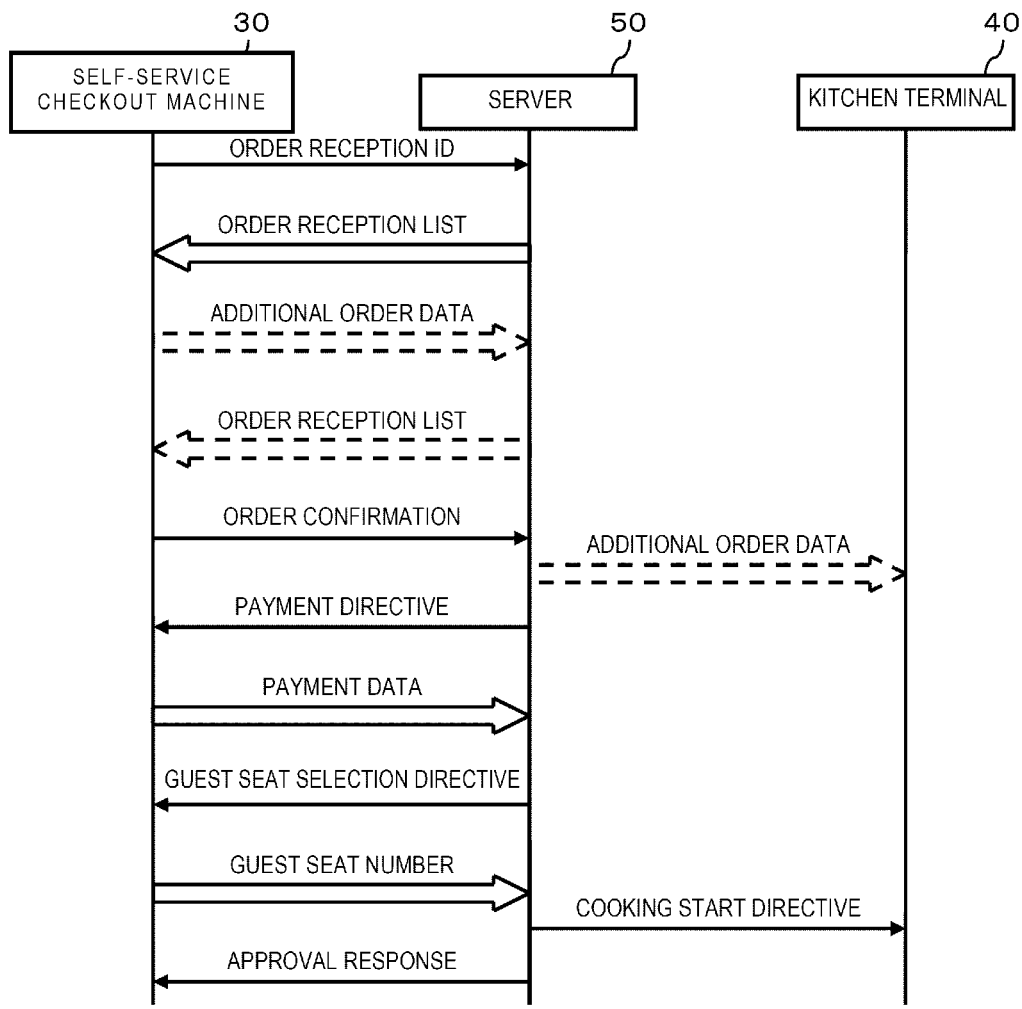
FIG. 10 is a diagram illustrating an example of a communication sequence among the self-service checkout machine, the order management server, and the kitchen terminal.
Figure 11:
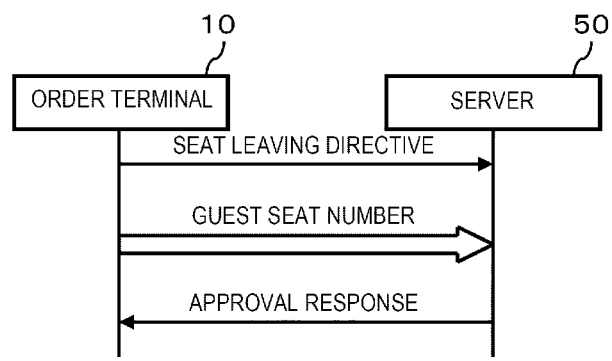
FIG. 11 is a diagram illustrating an example of a communication sequence between the order terminal and the order management server.

FIG. 9 is a diagram illustrating an example of a communication sequence among the order terminal 10, the order management server 50, and the kitchen terminal 40 when the order of the menu item, which is to be cooked, is received from the guest. FIG. 10 is a diagram illustrating an example of a communication sequence among the self-service checkout machine 30, the order management server 50, and the kitchen terminal 40 in a case of processing payment of the ordered menu item. FIG. 11 is a diagram illustrating an example of a communication sequence between the order terminal 10 and the order management server 50 after the guest who ends eating leaves the seat and the seat is cleaned.

Figure 12:
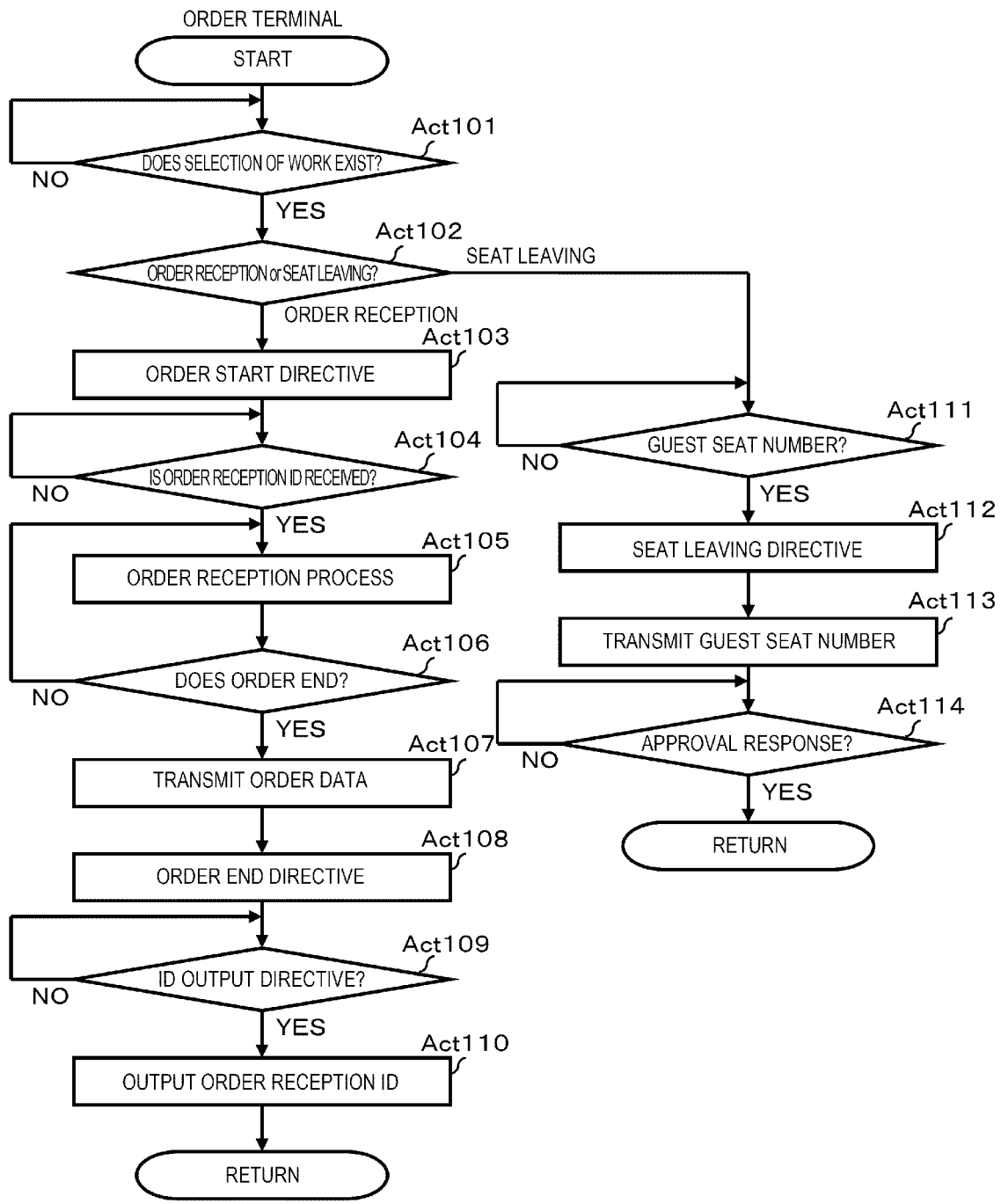
FIG. 12 is a flowchart illustrating a sequence of information processing performed by a processor of the order terminal according to a program.
Figure 13:
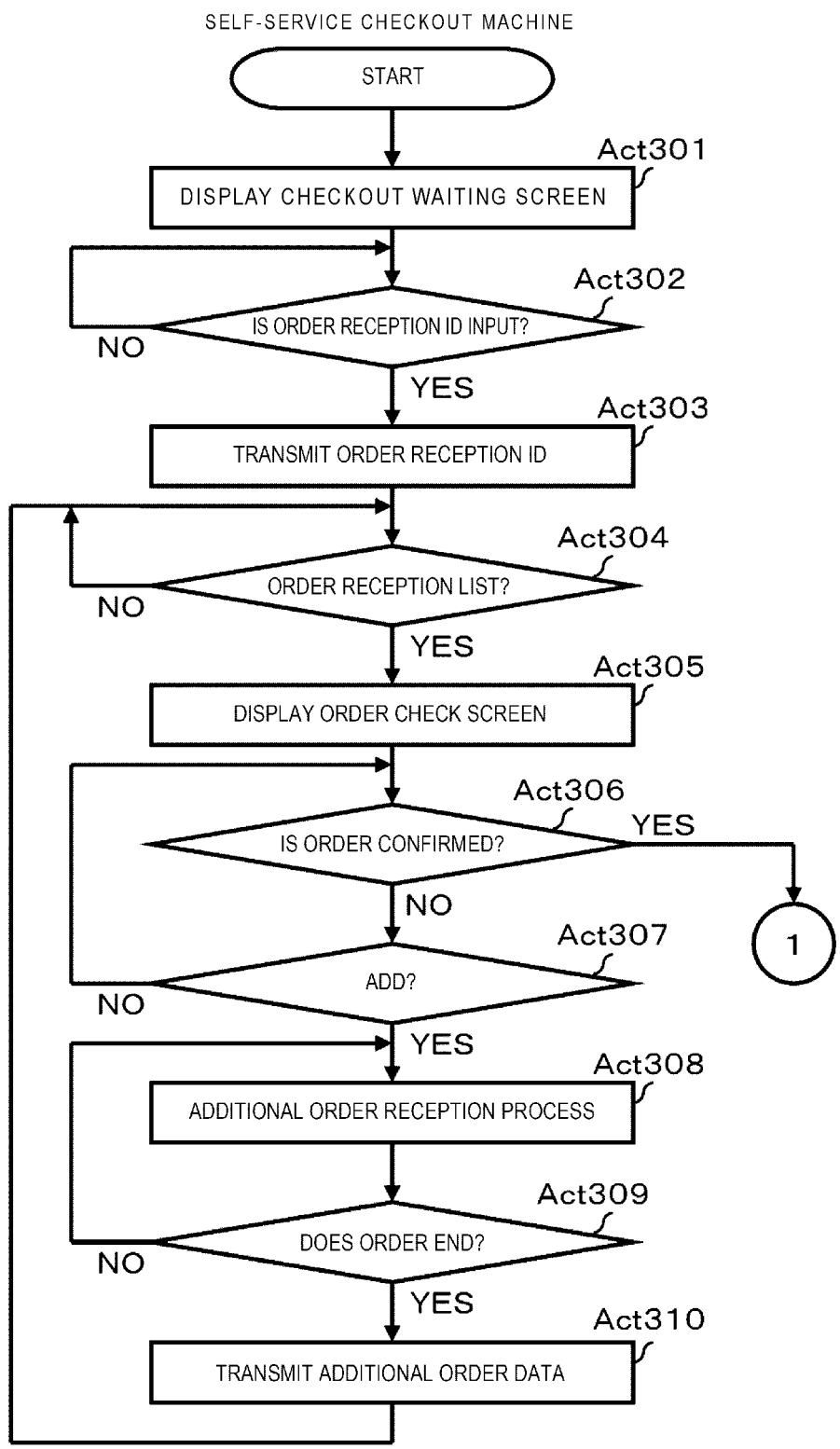
FIGS. 13 and 14 are flowcharts illustrating a sequence of information processing performed by a processor of the self-service checkout machine according to the program.
Figure 14:
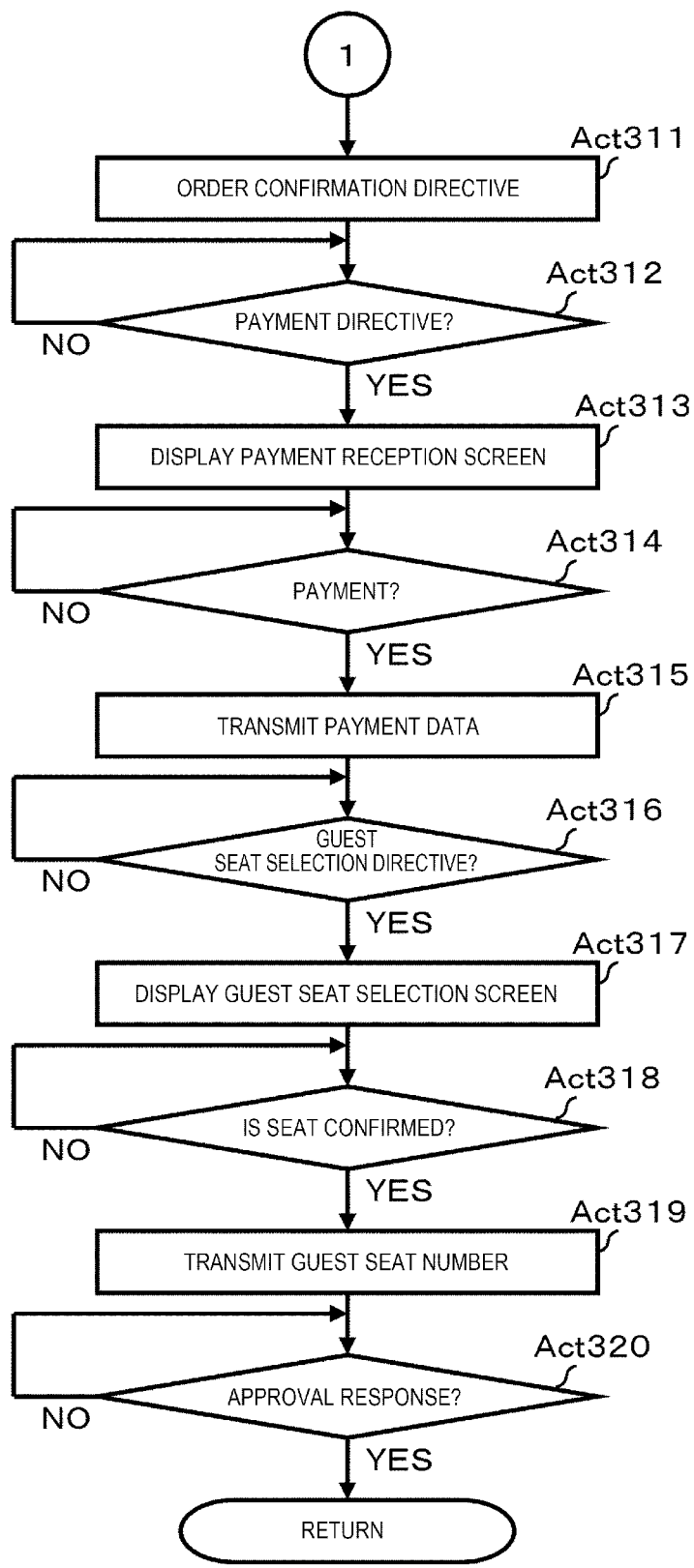
Figure 15:
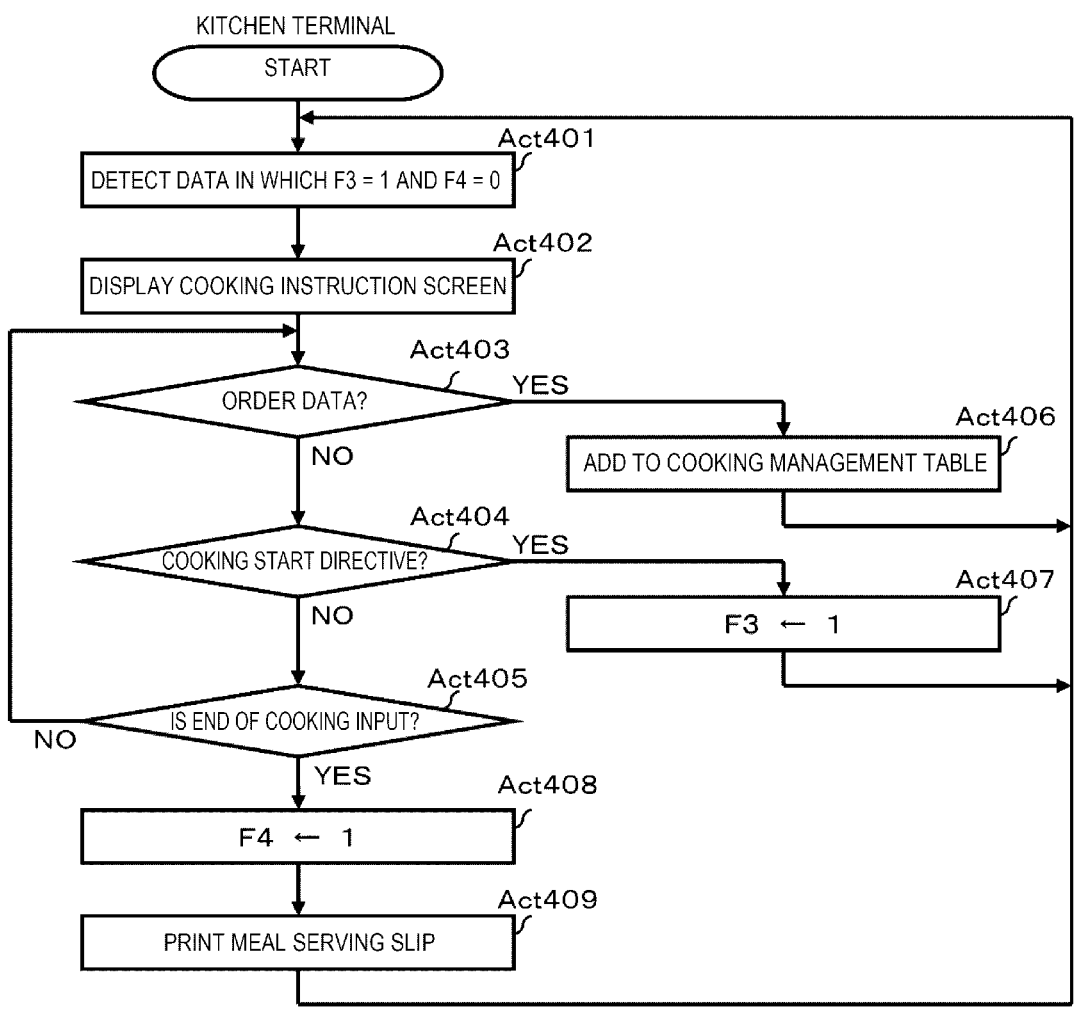
FIG. 15 is a flowchart illustrating a sequence of information processing performed by a processor of the kitchen terminal according to the program.
Figure 16:
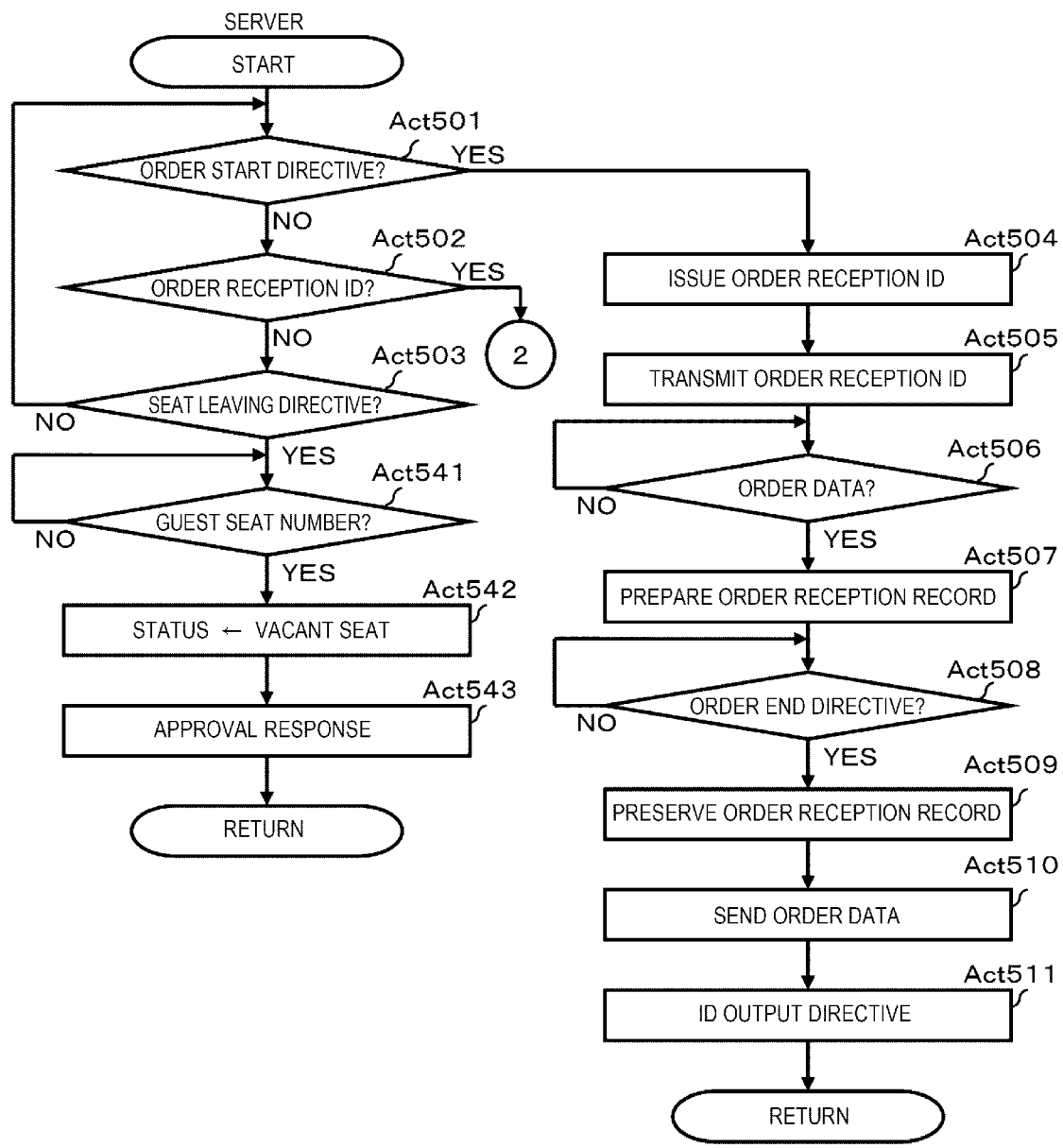
FIGS. 16 and 17 are flowcharts illustrating a sequence of information processing performed by a processor of the order management server according to the program.
Figure 17:
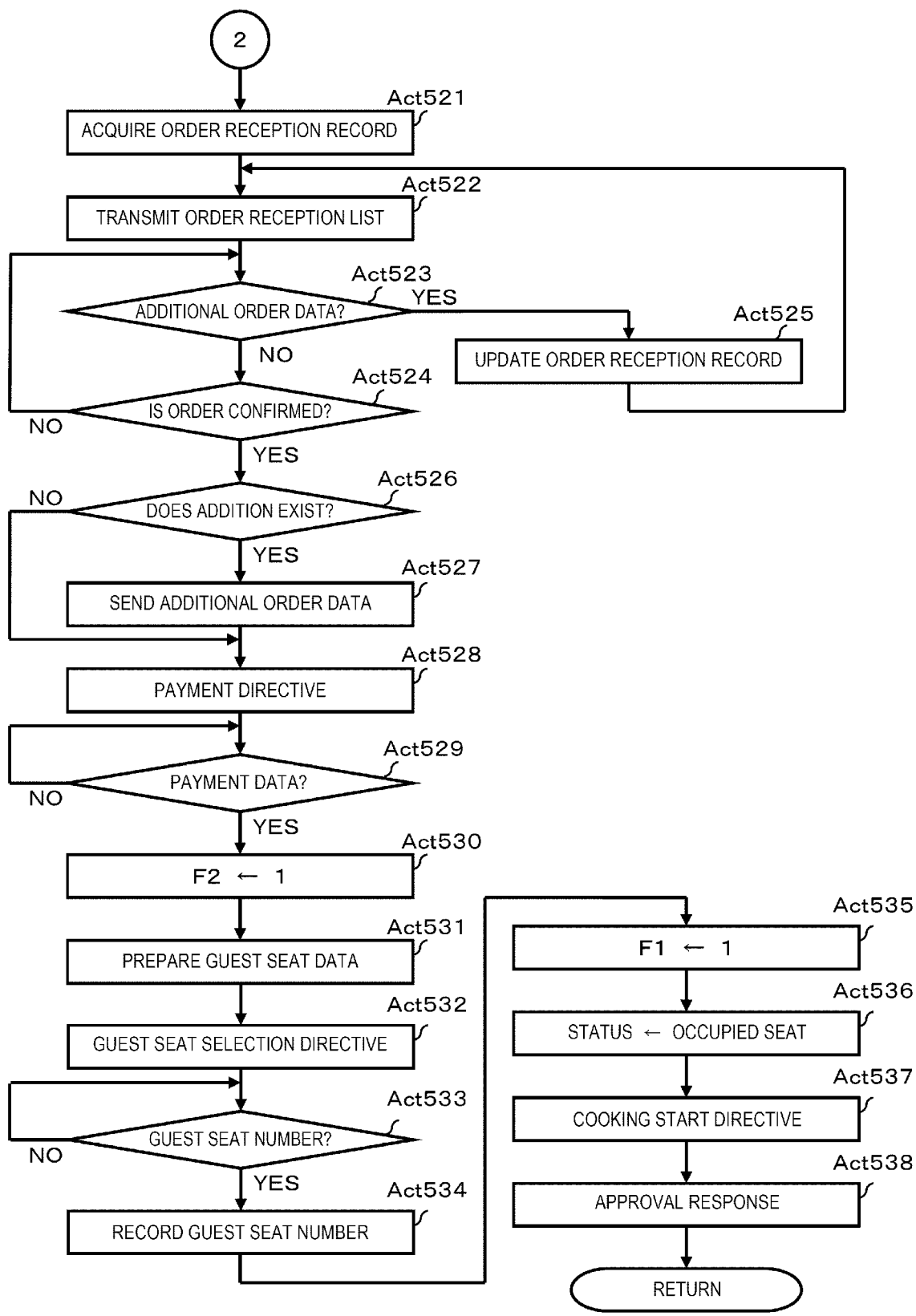

In addition, FIG. 12 is a flowchart illustrating a major sequence of information processing performed by the processor 101 of the order terminal 10 according to a program. FIGS. 13 and 14 are flowcharts illustrating a sequence of information processing performed by the processor 301 of the self-service checkout machine 30 according to the program. FIG. 15 is a flowchart illustrating a sequence of information processing performed by the processor 401 of the kitchen terminal 40 according to the program. FIGS. 16 and 17 are flowcharts illustrating a sequence of information processing performed by the processor 501 of the order management server 50 according to the program.

Hereinafter, an operation of the order management system 1 will be described with reference to FIGS. 9 to 17. The below described is an example, and the process sequence and the processed content are not limited particularly as long as it is possible to acquire the same result.

First, a hospitality staff provides hospitality while carrying the order terminal 10. If the order of the menu item is received from the guest, the staff first operates the input device 105 and selects the order reception work. That is, the order terminal 10 includes an order reception work and a seat leaving work as a work menu.

As illustrated in FIG. 12, the processor 101 of the order terminal 10 waits for selection of the work in Act 101. If the work is selected (Act 101, YES), the processor 101 determines whether the order reception work is selected or the seat leaving work is selected in Act 102. Here, since the order reception work is selected, the processor 101 controls the wireless interface 104 such that an order start command is output to the order management server 50 in Act 103. According to the control, an order start command is transmitted from the order terminal 10 to the order management server 50, as illustrated in FIG. 9. The command is received in the repeater 20, and is transmitted to the order management server 50 through the network 60.

As illustrated in FIG. 16, the processor 501 of the order management server 50 determines whether or not the order start command is received in Act 501. If the order start command is not received (Act 501, NO), the processor 501 determines whether or not the order reception ID is received in Act 502 (Act 502). If the order reception ID is not received (Act 502, NO), the processor 501 determines whether or not a seat leaving command is received in Act 503 (Act 503). The seat leaving command will be described below. If the seat leaving command is not received (Act 503, NO), the process returns to Act 501 and the processor 501 determines whether or not the order start command is received again. Here, the processor 501 waits for the order start command, the order reception ID, or the seat leaving command in Act 501 to Act 503.

If the processor 501 determines that the order start command is received through the communication interface 504 in a waiting state (Act 501, YES), a new order reception ID is issued in Act 504. Furthermore, the processor 501 controls the communication interface 504 such that the order reception ID is transmitted to the order terminal 10 in Act 505. According to the control, the order reception ID is transmitted from the order management server 50 to the order terminal 10 corresponding to an order start command transmission source, as illustrated in FIG. 9. The order reception ID is incorporated with a response command with respect to the order start command, and is wirelessly transmitted from the repeater 20 to a relevant order terminal 10.

In Act 103 of FIG. 12, the processor 101 of the order terminal 10, which controls transmission of the order start command, waits for the order reception ID in Act 104. If the processor 101 determines that the response command, in which the order reception ID is included, is received through the wireless interface 104 (Act 104, YES), the processor 101 performs an order reception process of Act 105. The order reception process includes a process of causing the display device 106 to display a screen used to receive an input of the menu item. In addition, the order reception process includes a process of preparing the order data based on the commodity code, the price, or the like of the menu item, the input of which is received.

If the hospitality staff confirms that the screen used to receive the input of the menu item is displayed on the display device 106 of the order terminal 10, the hospitality staff hears the order from the guest. Furthermore, the staff operates the input device 105 and inputs the menu item, which is ordered by the guest. Here, the staff may ask an additional menu, such as topping to the menu item, the order of which is received, to promote sales. After the input of the menu item, which is ordered by the guest, ends in this manner, the staff operates the input device 105 and announces an end of the order.

As illustrated in FIG. 12, the processor 101 of the order terminal 10 determines whether or not an order end announcement operation is performed in Act 106. If the order end announcement operation is not performed (Act 106, NO), the processor 101 continues the order reception process. Thus, the processor 101 performs the order reception process until the order end announcement operation is performed.

If it is determined that the order end announcement operation is performed (Act 106, YES), the processor 101 controls the wireless interface 104 such that the order data, which is prepared in the order reception process, is output to the order management server 50 in Act 107. According to the control, the order data is transmitted from the order terminal 10 to the order management server 50, as illustrated in FIG. 9. The order reception ID, which is received in the process of Act 104, is added to the order data. The order data is received in the repeater 20, and is transmitted to the order management server 50 through the network 60.

If transmission of the order data ends, the processor 101 controls the wireless interface 104 such that the order end command is output to the order management server 50 in Act 108. According to the control, an order end command is transmitted from the order terminal 10 to the order management server 50, as illustrated in FIG. 9. The command is received in the repeater 20, and is transmitted to the order management server 50 through the network 60.

In Act 505 of FIG. 16, the processor 501 of the order management server 50, which controls transmission of the order reception ID, waits for the order data in Act 506. If the order data is received through the communication interface 504 (Act 506, YES), the processor 501 prepares the order reception record 70R based on the order data in Act 507. Here, the processor 501 sets the order reception ID, which is added to the order data, as the order reception ID of the order reception record 70R. In addition, the date and time, which is clocked in the clock 505, is set as the order reception date and time of the order reception record 70R. In addition, the amount of money corresponding to the order data is summed, and the sum is set to the total amount of money of the order reception record 70R. The guest seat number is not set. Both the guest seat flag F1 and the payment flag F2 are reset to "0".

Here, the order management server 50 is included in an order input unit in such a way that the computer based on the processor 501 performs a process of Act 506, and is included in a storage unit in such a way that the computer performs the process of Act 507.

If preparation of the order reception record 70R ends, the processor 501 waits for the order end command in Act 508. If it is determined that the order end command is received through the communication interface 504 (Act 508, YES), the processor 501 stores the order reception record 70R, which is prepared in the process of Act 507, in the order reception file 70 in Act 509. In addition, the processor 501 performs control such that the order data, which is received in the process of Act 506, is sent to the kitchen terminal 40 in Act 510. Furthermore, the processor 501 controls the communication interface 504 such that an ID output command is transmitted to the order terminal 10 in Act 511. According to the control performed in Act 510 and Act 511, the order data is transmitted from the order management server 50 to the order terminal 10 through the network 60, as illustrated in FIG. 9. The order reception ID is added to the order data. In addition, the ID output command is transmitted from the order management server 50 to the order terminal 10 of an order end command source. The command is wirelessly transmitted from the repeater 20 to the relevant order terminal 10.

In Act 108 of FIG. 12, the processor 101 of the order terminal 10, which controls transmission of the order end command, waits for the ID output command in Act 109. If it is determined that the ID output command is received through the wireless interface 104 (Act 109, YES), the processor 101 controls an output of the order reception ID, which is received in the process of Act 104, in Act 110. Specifically, the processor 101 outputs the order reception ID to the order slip P1 (see FIG. 8). That is, the processor 101 prepares print data of the order slip P1 which includes the order reception ID. Furthermore, the processor 101 outputs the print data to the printer 110 through the printer interface 107. Thus, if the printer 110 is operated, the order slip P1 is issued.

Figure 18:
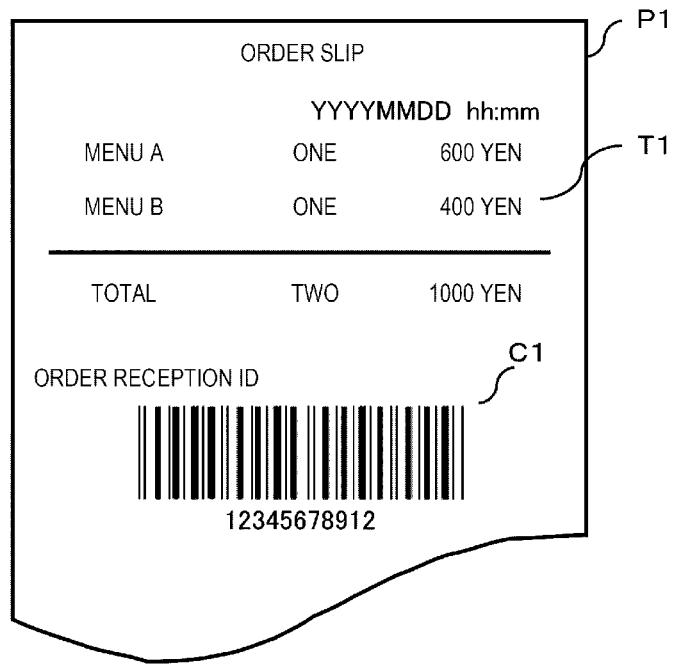
FIG. 18 is a diagram illustrating an example of an order slip.

FIG. 18 is a diagram illustrating an example of the order slip P1. As illustrated in FIG. 18, text data T1, which shows a name, the order score, the amount of money, the total amount of money, and the like of the menu item ordered by the guest, is printed on the order slip P1. In addition, a barcode C1, which shows the order reception ID, is printed.

Barcoding of the order reception ID may be performed in the order management server 50. That is, the processor 501 of the order management server 50 controls the communication interface 504 in Act 504 of FIG. 16 such that the order reception ID and data, which is acquired by barcoding the order reception ID, are transmitted to the order terminal 10.

Since the order slip P1 is handed over from the staff to the guest, the guest moves to a location where the self-service checkout machine 30 is located with the order slip P1.

As illustrated in FIG. 13, the processor 301 of the self-service checkout machine 30 causes the display device 308 to display a checkout waiting screen SC1 (see FIG. 19) in Act 301.

Figure 19:
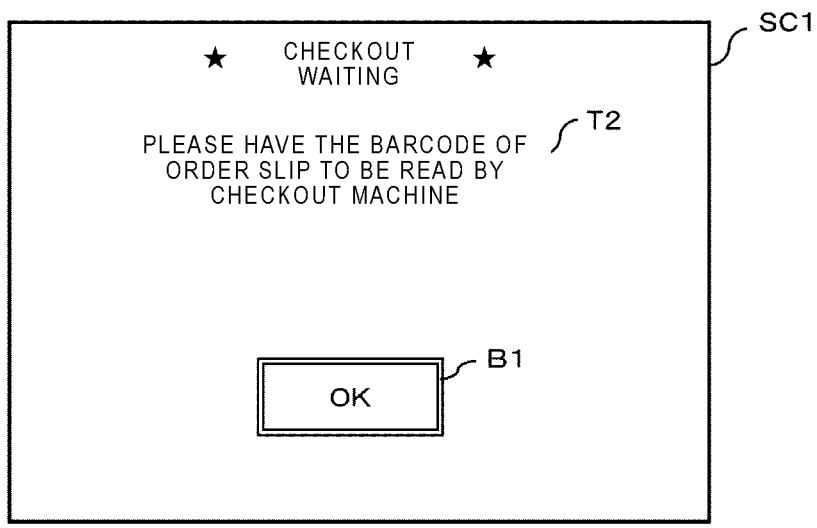
FIG. 19 is a diagram illustrating an example of an accounting waiting screen.

FIG. 19 is a diagram illustrating an example of the checkout waiting screen SC1. As illustrated in FIG. 19, text data T2, which is used to instruct the guest to cause the barcode C1 of the order reception ID printed on the order slip P1 to be read by the reading device 306 of the self-service checkout machine 30, is displayed together with an image of an OK button B1 on the checkout waiting screen SC1.

Here, the guest who checked the checkout waiting screen SC1 causes the barcode C1 printed on the order slip P1 to be read by the reading device 306, and inputs the OK button B1. For example, if the input device 307 is the touch panel, the guest touches the "OK" button B1 of the checkout waiting screen SC1. For example, if the input device 307 is the keyboard or the mouse, the guest overlaps a pointer, which is displayed on the checkout waiting screen SC1, with the OK button B1, and performs a process. Hereinafter, the process is the same as in a case where a button which is displayed on another screen is input.

In Act 301 of FIG. 13, the processor 301 of the self-service checkout machine 30, which causes the checkout waiting screen SC1 to be displayed, waits for the order reception ID to be input in Act 302. If it is determined that the order reception ID is input from the barcode C1, which is read through the reading device 306 (Act 302, YES), the processor 301 controls the communication interface 304 such that the order reception ID is transmitted to the order management server 50 in Act 303. According to the control, as illustrated in FIG. 10, the order reception ID is transmitted from the self-service checkout machine 30 to the order management server 50 through the network 60.

As described above, the processor of the order management server 50 waits for the order start command, the order reception ID, or the seat leaving command in Act 501 to Act 503 of FIG. 16. If the processor 501 determines that the order reception ID is received through the communication interface 504 in the waiting state (Act 502, YES), the processor 501 searches for the order reception file 70 and acquires the order reception record 70R, which includes the order reception ID, in Act 521 of FIG. 17. Furthermore, the processor 501 controls the communication interface 504 such that the data of an order reception list is prepared based on the order data and the total amount of money, which are included in the order reception record 70R, and the data of the order reception list is transmitted to the self-service checkout machine 30 in Act 522. According to the control, the data of the order reception list is transmitted from the order management server 50 to the self-service checkout machine 30 through the network 60, as illustrated in FIG. 10.

The processor 301 of the self-service checkout machine 30, which controls the transmission of the order reception ID in Act 303 of FIG. 13, waits for the data of the order reception list in Act 304. If the data of the order reception list is received through the communication interface 304, the processor 301 causes the display device 308 to display an order check screen SC2 (see FIG. 20) based on the data of the order reception list in Act 305.

FIG. 20 is a diagram illustrating an example of the order check screen SC2. As illustrated in FIG. 20, text data T3, which includes a list, that is, the name, the order score, the amount of money, a total score, the total amount of money, and the like of the menu items ordered by the guest are displayed together with images of an addition button B2 and an order confirmation button B3 on the order check screen SC2.

Here, the guest who checked the order check screen SC2 operates the input device 307 in order to input the addition button B2 if an additional order exists and to input the order confirmation button B3 if the order is confirmed.

In Act 305 of FIG. 13, the processor 301 of the self-service checkout machine 30, which displays the order check screen SC2, determines whether or not the order confirmation button B3 is input in Act 306. If the order confirmation button B3 is not input (Act 306, NO), the processor 301 determines whether or not the addition button B2 is input in Act 307. If the addition button B2 is not input (Act 307, NO), the process returns to Act 306, and the processor 301 determines whether or not the order confirmation button B3 is input again. Thus, the processor 301 waits for the order confirmation button B3 to be input and the addition button B2 to be input in the processes of Act 306 and Act 307.

If it is determined that the addition button B2 is input through the operation input of the input device 307 in the waiting state (Act 307, YES), the processor 301 performs an additional order reception process of Act 308. The additional order reception process is substantially the same as the order reception process which is performed by the processor 101 of the order terminal 10 in Act 105. That is, the additional order reception process includes a process of causing the display device 308 to display the screen used to receive the input of the menu item. In addition, the additional order reception process includes a process of preparing the order data based on the commodity code, the price, or the like of the menu item, the input of which is received.

The guest who inputs the addition button B3 subsequently operates the input device 307, and inputs the menu item which is additionally ordered. If the input of the menu item ends, the guest operates the input device 307 and announces end of the order.

As illustrated in FIG. 13, the processor 301 of the self-service checkout machine 30 determines whether or not the order end announcement operation is performed in Act 309. If the order end announcement operation is not performed (Act 309, NO), the processor 301 continues the additional order reception process. Thus, the processor 301 performs the additional order reception process until the order end announcement operation is performed.

If the processor 301 determines that the order end announcement operation is performed (Act 309, YES), the processor 301 controls the communication interface 304 such that the additional order data, which is prepared in the additional order reception process, is transmitted to the order management server 50 in Act 310. According to the control, the additional order data is transmitted from the self-service checkout machine 30 to the order management server 50 through the network 60, as illustrated in FIG. 10. The order reception ID, which is input in the process of Act 302, is added to the additional order data.

In Act 522 of FIG. 17, the processor 501 of the order management server 50, which controls transmission of the order reception list, determines whether or not the additional order data is received in Act 523. If the additional order data is not received (Act 523, NO), the processor 501 determines whether or not an order confirmation command is received in Act 524. The order confirmation command will be described below. If the order confirmation command is not received, the process returns to Act 523, and the processor 501 determines again whether or not the additional order data is received. Thus, the processor 501 waits for the additional order data to be received or the order confirmation command to be received through the processes of Act 523 and Act 524.

Here, the order management server 50 is included in a waiting unit in such a way that the computer, which mainly uses the processor 501, performs the processes in Act 502 and Act 521 to Act 524.

If it is determined that the additional order data is received through the communication interface 504 in the waiting state (Act 523, YES), the processor 501 updates the order reception record 70R based on the additional order data in Act 525. That is, the processor 501 adds the additional order data to the order reception record 70R acquired from the order reception file 70 in the process of Act 521. In addition, the processor 501 adds the amount of money corresponding to the additional order data to the total amount of money of the order reception record 70R. If updating of the order reception record 70R ends in this manner, the process returns to Act 522, and the processor 501 prepares the data of the order reception list based on the order data, the additional order data, and the total amount of money, which are included in the order reception record 70R acquired after the updating, and controls the communication interface 504 such that the data of the order reception list is transmitted to the self-service checkout machine 30. According to the control, the data of the order reception list is transmitted from the order management server 50 to the self-service checkout machine 30 through the network 60, as illustrated in FIG. 10.

In Act 310 of FIG. 13, the process returns to Act 403, and the processor 301 of the self-service checkout machine 30, which controls transmission of the additional order data, waits for the data of the order reception list. If the data of the order reception list is received through the communication interface 304, the processor 301 causes the display device 308 to display the order check screen SC2 again based on the data of the order reception list in Act 305.

Here, if the guest inputs the order confirmation button B3, the processor 301 of the self-service checkout machine 30 determines that the order confirmation button B3 is input (Act 306, YES). Furthermore, the processor 301 controls the communication interface 304 such that the order confirmation command is transmitted to the order management server 50 in Act 311 of FIG. 14. According to the control, the order confirmation command is transmitted from the self-service checkout machine 30 to the order management server 50 through the network 60, as illustrated in FIG. 10.

If the processor 501 determines that the order confirmation command is received through the communication interface 504 in the waiting states in Act 523 and Act 524 of FIG.

17 (Act 524, YES), the processor 501 determines whether or not the additional order exists in Act 526. For example, if the process of Act 525 is performed, the processor 501 sets an addition flag to "1". Furthermore, the processor 501 determines whether or not the addition flag is set, and determines that the additional order exists if the addition flag is set in Act 526.

If it is determined that the additional order exists (Act 526, YES), the processor 501 performs control such that the additional order data is sent to the kitchen terminal 40 in Act 527. According to the control, the additional order data is transmitted from the order management server 50 to the order terminal 10 through the network 60, as illustrated in FIG. 10. In contrast, if it is determined that the additional order does not exist (Act 526, NO), the processor 501 skips the process of Act 527.

The processor 501 controls the communication interface 504 such that a payment command is transmitted to the self-service checkout machine 30 in Act 528. According to the control, the payment command is transmitted from the order management server 50 to the self-service checkout machine 30 through the network 60, as illustrated in FIG. 10.

In Act 311 of FIG. 14, the processor 301 of the self-service checkout machine 30, which controls transmission of the order confirmation command, waits for the payment command in Act 312. If it is determined that the payment command is received through the communication interface 304 (Act 312, YES), the processor 301 causes the display device 308 to display a payment reception screen SC3 (see FIG. 21).

FIG. 21 is a diagram illustrating an example of a payment reception screen SC3. As illustrated in FIG. 21, text data T4, which shows the amount of payment that is the total amount of money corresponding to the order data, is displayed on the payment reception screen SC3, together with images of a cash button B4 and an electronic money button B5.

Here, if payment is performed using cash for the amount of payment, the guest who checks the payment reception screen SC3 inputs the cash button B4, and inserts the cash into the automatic change machine 305. Thus, payment data base on the payment using cash is input to the self-service checkout machine 30. In contrast, if payment is performed using the electronic money, the guest inputs the electronic money button B5 and brings a medium, in which the electronic money is recorded, near to the reader/writer 310. Thus, with respect to the self-service checkout machine 30, payment data using the electronic money is input.

In Act 313 of FIG. 13, the processor 301 of the self-service checkout machine 30, which causes the payment reception screen SC3 to be displayed, waits for the payment data to be input in Act 314. If it is determined that the payment data using the cash or the electronic money is input (Act 314, YES), the processor 301 controls the communication interface 304 such that the payment data is transmitted to the order management server 50 in Act 315. According to the control, the payment data is transmitted from the self-service checkout machine 30 to the order management server 50 through the network 60, as illustrated in FIG. 10.

In Act 528 of FIG. 17, the processor 501 of the order management server 50, which controls transmission of the payment command, waits for the payment data in Act 529. If it is determined that the payment data is received through the communication interface 504 (Act 529, YES), the processor 501 sets the payment flag F2 of the order reception record, which is acquired in the process of Act 521, to "1" in Act 530.

Subsequently, the processor 501 prepares the guest seat data based on each seat record of the guest seat file 80 in Act 531. The guest seat data is acquired by performing processing according to a status on an image indicative of a seat corresponding to the guest seat number. For example, the seat is expressed using an image of a chair. If a status corresponding to the guest seat number of the seat indicates a vacant seat "0", the image is set as a void image. In the same manner, if the status corresponding to the guest seat number of the seat indicates an occupied seat "1", the image is set as a black-painted image.

If the guest seat data is prepared in this manner, the processor 501 controls the communication interface 504 such that a guest seat selection command, which includes the guest seat data, is transmitted to the self-service checkout machine 30 in Act 532. According to the control, the guest seat selection command is transmitted from the order management server 50 to the self-service checkout machine 30 through the network 60, as illustrated in FIG. 10.

In Act 315 of FIG. 14, the processor 301 of the self-service checkout machine 30, which controls transmission of the payment data, waits for the guest seat selection command in Act 316. If it is determined that the guest seat selection command is received through the communication interface 304 (Act 316, YES), the processor 301 causes the display device 308 to display a guest seat selection screen SC4 (see FIG. 22) based on the guest seat data included in the command in Act 317.

Figure 22:
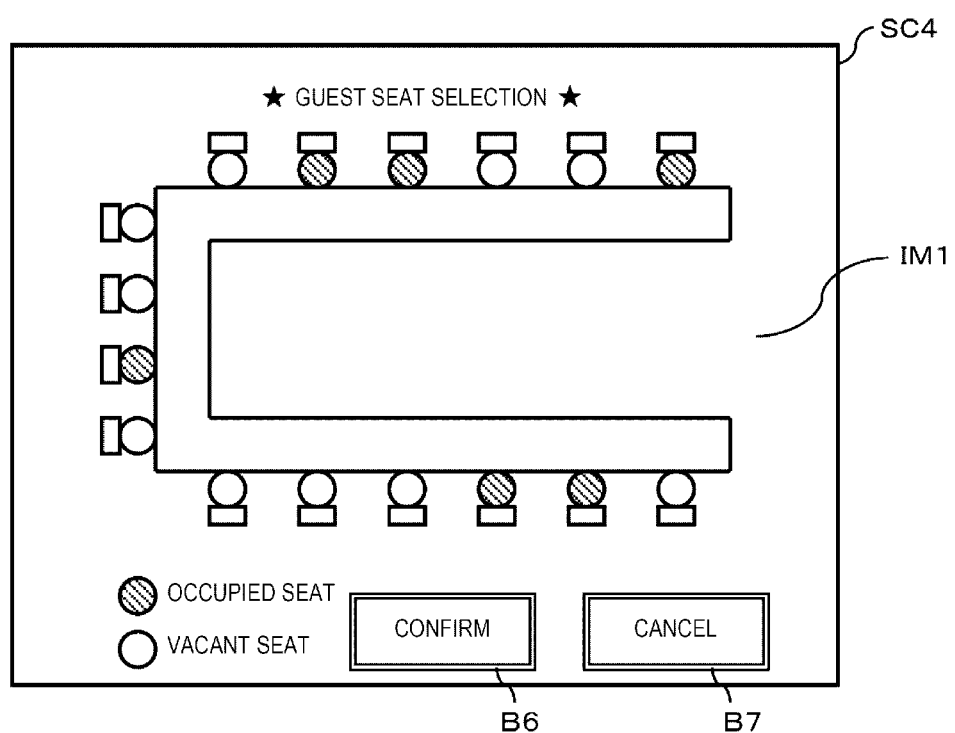
FIG. 22 is a diagram illustrating an example of a guest seat selection screen.

FIG. 22 is a diagram illustrating an example of the guest seat selection screen SC4. As illustrated in FIG. 22, an image IM1, which shows a layout of the seats, and images of a confirmation button B6 and a cancellation button B7 are displayed on the guest seat selection screen SC4. Furthermore, in the image IM1, it is possible to select a chair image indicative of the vacant seat, but it is not possible to select a chair image indicative of the occupied seat.

Here, the guest who checks the guest seat selection screen SC4 operates the input device 307 and selects seats corresponding to the number of people from the char images indicative of the vacant seat. That is, one guest selects one seat. For example, a group including three guests selects three seats. If selection of the seat ends, the guest inputs the confirmation button B6. If the selected seat is cancelled, the guest inputs the cancellation button B7. If the processor 301 determines that the cancellation button B7 is input, the processor 301 clicks information (guest seat number) of the seats which is selected until then.

In Act 317 of FIG. 14, the processor 301, which causes the guest seat selection screen SC4 to be displayed, waits for the seat to be confirmed in Act 318. If a necessary number of seats are selected from the image IM1 and it is determined that the confirmation button B6 is input (Act 318, YES), the processor 301 controls the communication interface 304 such that data, which includes the number of selected seats, is transmitted to the order management server 50. According to the control, the data corresponding to the number of seats is transmitted from the self-service checkout machine 30 to the order management server 50 through the network 60, as illustrated in FIG. 10.

In Act 532 of FIG. 17, the processor 501 of the order management server 50, which controls transmission of the guest seat selection command, waits for the data corresponding to the number of seats in Act 533. If it is determined that the data corresponding to the number of seats is received through the communication interface 504 (Act 533, YES), the processor 501 records the guest seat number in the order reception record, which is acquired in the process of Act 521, in Act 534. In addition, the processor 501 sets the guest seat flag F1 of the order reception record to "1" in Act 535. Furthermore, the processor 501 searches for the guest seat file 80 and updates a status associated with the guest seat number to a value "1" indicative of the "occupied seat" in Act 536.

Here, the order management server 50 is included in a seat input unit in such a way that the computer based on the processor 501 performs the processes in Act 531 to Act 534.

Thereafter, the processor 501 controls the communication interface 504 such that a cooking start command is transmitted to the kitchen terminal 40 in Act 537. In addition, the processor 501 controls the communication interface 504 such that an approval response command is transmitted to the self-service checkout machine 30 in Act 538. Thereafter, the process returns to Act 501 in FIG. 16. That is, the processor 501 is in a state waiting for the order start command, the order reception ID, or a command.

According to the control in Act 537 and Act 538, the cooking start command is transmitted from the order management server 50 to the kitchen terminal 40 through the network 60, as illustrated in FIG. 10. In addition, the approval response command is transmitted from the order management server 50 to the self-service checkout machine 30 through the network 60. The cooking start command includes the order reception ID, the order reception date and time, and the guest seat number of the order reception record 70R, in which both the payment flag F2 and the guest seat flag F1 are set to "1", in Act 530 and Act 535.

Here, the order management server 50 is included in an instruction unit in such a way that the computer based on the processor 501 performs the processes in Act 528 to Act 537.

In Act 319 of FIG. 14, the processor 301 of the self-service checkout machine 30, which controls transmission of the data corresponding to the number of seats, waits for the approval response in Act 320. If it is determined that the approval response command is received through the communication interface 304 (Act 320, YES), the process returns to Act 301 in FIG. 13. That is, the processor 301 causes the display device 308 to display the checkout waiting screen SC1.

The processor 401 of the kitchen terminal 40 searches for the cooking management table 90 in Act 401 of FIG. 15. Furthermore, the processor 401 determines a data record, in which the cooking start flag F3 is set to "1" and the cooking end flag F4 is reset to "0", from the cooking management table 90. Furthermore, the processor 401 prepares the cooking instruction screen based on the data record which is obtained from the cooking management table 90 and causes the display device 406 to display the cooking instruction screen in Act 402.

The cooking instruction screen is a screen used to notify start of the cooking of the menu item, which is specified using the commodity code of the data record obtained from the cooking management table 90, to the cooking staff. Therefore, the cooking staff may perform the cooking of the menu item, the order of which is received from the guest, according to content of the cooking instruction screen. If the cooking ends, the staff operates the input device 405 and inputs end of the cooking of the menu item.

In Act 402 of FIG. 15, the processor 401 of the kitchen terminal 40, which causes the cooking instruction screen to be displayed, determines whether or not the order data or the additional order data is received in Act 403. If the order data or the additional order data is not received (Act 403, NO), the processor 401 determines whether or not the cooking start command is received in Act 404. If the cooking start command is not received (Act 404, NO), the processor 401 determines whether or not input of the end of the cooking is performed in Act 405. If the input of the end of the cooking is not performed (Act 405, NO), the processor 401 returns to Act 403, and determines again whether or not the order data or the additional order data is received. Thus, the processor 401 waits for the order data or the additional order data to be received, the cooking start command to be received, or the input of the end of the cooking end to be performed in the processes of Act 403 to Act 405.

If it is determined that the order data or the additional order data is received through the communication interface 404 in the waiting state (Act 403, YES), the processor 401 adds the order data or the additional order data to the cooking management table 90 in Act 406. Specifically, the processor 401 associates the order reception ID, which is added to the order data or the additional order data, with the commodity code, which is included in the order data or the additional order data, and adds a result of association to a relevant field of the cooking management table 90. Here, the order reception date and time and the guest seat number on the same line are blank. In addition, both the cooking start flag F3 and the cooking end flag F4 are reset to "0".

If the addition process to the cooking management table 90 ends, the process returns to Act 401. In this case, the cooking start flag F3 or the cooking end flag F4 of the data record, which is stored in the cooking management table 90 does not change, and thus the cooking instruction screen is not updated.

If it is determined that the cooking start command is received through the communication interface 404 in the waiting states in Act 403 to Act 405 (Act 404, YES), the processor 401 searches for the cooking management table 90 using the order reception ID included in the command in Act 407. Furthermore, the processor 401 sets the cooking start flag F3 of the data record, which is associated with the order reception ID, to "1". In addition, the order reception date and time and the guest seat number, which are included in the command, are described in the data record.

If the above-described processes end, the process returns to Act 401. In this case, the cooking end flag F4 of the data record, in which the cooking start flag F3 is set to "1" in the process of Act 407, is "0", and thus the start of the cooking of the menu item, which is specified using the commodity code of the data record, is instructed.

If the input of the end of the cooking is received through the input device 405 (Act 405, YES) in the waiting states in Act 403 to Act 405, the processor 401 searches for the cooking management table 90 using the reception ID and the commodity code of the menu item, the cooking of which is instructed to be ended, in Act 408. Furthermore, the processor 401 sets the cooking end flag F4 of the data record, which is associated with the order reception ID and the commodity code, to "1". In addition, the processor 401 prepares the print data of the catering slip based on the commodity code, the order reception date and time, and the guest seat number of the data record in Act 409. Furthermore, the processor 401 outputs the print data to the print device 407, and controls the printing of the catering slip. In the catering slip, the item name, the order reception date and time, the guest seat number, and the like of the menu item, the cooking of which ends, are printed. Therefore, the staff who checks the catering slip may perform the catering of the commodity, the cooking of which ends, on the seat corresponding to the guest seat number.

If the process of Act 409 ends, the process returns to Act 401. In this case, the menu item, which is specified using the commodity code of the data record in which the cooking end flag F4 is set to "1" in the process of Act 408, is removed from the cooking instruction screen.

Since the guest who finishes eating and drinking has already completed the price payment, the guest can exit the store without performing checkout. Here, if the hospitality staff notices that the guest has left the seat, the hospitality staff tidies the seat. If the seat is completely tidied, the staff operates the input device 105, and selects the seat leaving work. Furthermore, the staff operates the input device 105, and inputs the number of seat which is completely tidied.

If the processor 101 of the order terminal 10 determines that the seat leaving work is selected in Act 102 of FIG. 12, the processor 101 waits for the guest seat number to be input in Act 111. If it is determined that the guest seat number is input (Act 111, YES), the processor 101 controls the wireless interface 104 such that the seat leaving command is transmitted to the order management server 50 in Act 112. Subsequently, the processor 101 controls the wireless interface 104 such that the guest seat number, which is input through the input device 105, is transmitted to the order management server 50.

According to the control in Act 112, the seat leaving command is transmitted from the order terminal 10 to the order management server 50, as illustrated in FIG. 11. The command is received in the repeater 20 and is transmitted to the order management server 50 through the network 60. In addition, according to the control in Act 113, the data corresponding to the number of seats is transmitted from the order terminal 10 to the order management server 50, as illustrated in FIG. 11. In addition, the data is also received in the repeater 20 and is transmitted to the order management server 50 through the network 60.

If the processor 501 of the order management server 50 determines that the seat leaving command is received through the communication interface 504 (Act 504, YES) in the waiting states in Act 502 to Act 504, the processor 501 waits for the data corresponding to the number of seats in Act 541. If it is determined that the data corresponding to the number of seats is received through the communication interface 504 (Act 541, YES), the processor 501 searches for the guest seat file 80 and updates a status, which is associated with the guest seat number, to a value "0" which indicates the "vacant seat" in Act 542. Thereafter, the processor 501 controls the communication interface 504 such that the approval response is transmitted to the order terminal 10, which transmits the seat leaving command, in Act 543. According to the control, the approval response command is transmitted from the order management server 50 to the order terminal 10, as illustrated in FIG. 11. The command is wirelessly transmitted from the repeater 20 and is received in the order terminal 10 corresponding to the destination.

In Act 113 of FIG. 12, the processor 101 of the order terminal 10, which controls transmission of the data corresponding to the number of seats, waits for the approval response in Act 114. If it is determined that the approval response command is received through the wireless interface 104 (Act 114, YES), the process returns to the process of Act 1. That is, the processor 101 waits for any of the order reception work or the seat leaving work to be selected. Hereinabove, the description of the operation of the order management system 1 ends.

In this manner, the order terminal 10 functions as an order reception unit that receives an order of a commodity (menu item) which is required to be cooked. Furthermore, the order terminal 10 is operated by the hospitality staff. Therefore, since the hospitality staff receives the order of the guest, an additional order is expected by devising the hospitality, and thus it is possible to expect increase in sales.

In contrast, the self-service checkout machine 30 functions as a checkout unit which processes the price payment of the commodity, the order of which is received in the order terminal 10. Furthermore, the self-service checkout machine 30 is operated by the guest. Since the checkout staff is not necessary, it is possible to complement the lack of the employees.

In the order management system 1 which includes the order terminal 10 and the self-service checkout machine 30, the order management server 50, which plays a pivotal role, functions as a control unit which instructs the kitchen terminal 40 to start the cooking of the commodity, the price payment of which is processed in the self-service checkout machine 30. In addition, the kitchen terminal 40 functions as a report unit which reports the start of the cooking of the commodity using the instruction from the order management server 50. That is, since the start of the cooking is instructed to the kitchen using a fact that the guest ends the price payment as a trigger, a non-payment status in which the guest leaves the store without paying fees does not happen even though the self-service checkout machine 30 is introduced. Therefore, it is not necessary for the employee to stand near to the self-service checkout machine 30, and thus an effect of complementing the lack of the employees is sure.

In addition, the self-service checkout machine 30 functions as a seat reception unit which receives input of the guest seat data corresponding to the guest seat number. Furthermore, the order management server 50 instructs to start the cooking of the commodity on a condition that the guest seat data is input with respect to the guest who orders the commodity, the price payment of which is processed in the self-service checkout machine 30 and the payment of which ends.

In a case of a restaurant where a commodity having short cooking time is provided, there may be a case where a seat is not found and the guest waits for a vacant seat even though the guest ends the order in congestion hour. Even in the case, the start of the cooking is instructed because the guest secures the seat. That is, the cooked commodity is provided only to a guest who secured the seat.

In addition, the order management server 50 transmits information of the commodity to the kitchen terminal 40 at a point of time in which the order of the commodity is received in the order terminal 10. Thereafter, the order management server 50 instructs the kitchen terminal 40 to start the cooking of the commodity on a condition that the price payment of the commodity is processed in the self-service checkout machine 30.

Here, in the kitchen terminal 40, the processor 401 determines data in which both the cooking start flag F3 and the cooking end flag F4 are "0", and causes the display device 406 to display information of the menu item corresponding to the data. With this, it is possible for the cooking staff to estimate a subsequent commodity, the start of the cooking of which is instructed. Therefore, it is possible for the staff to begin preparation for the cooking before the cooking start instruction is provided, and thus it is possible to increase work efficiency.

As illustrated above, the embodiment of the order management system, which is capable of achieving the effective self-practical form in the restaurant, is described. However, the embodiment is not limited thereto.

For example, in the embodiment, description is performed such that the order terminal 10 is operated by the hospitality staff. However, the operator of the order terminal 10 is not certainly limited to the staff. If a portable general-purposed computer apparatus, such as the smart phone or the tablet terminal, is used as the order terminal 10, the guest may be the operator of the order terminal 10. In this case, it is possible for the guest who is the operator to order the menu item before coming to the restaurant. If the order ends before coming to the restaurant, it is possible to directly go to a location where the self-service checkout machine 30 is installed and to end the checkout, and thus it is possible to reduce time for checkout.

For example, in the embodiment, the guest seat number is input in the self-service checkout machine 30. On this point, if the seat is already confirmed when the order is performed, the guest seat number may be input in the order terminal 10. If the guest seat number is input in the order terminal 10, the guest seat number is recorded and the guest seat flag F1 is set to "1" when the processor 501 of the order management server 50 prepares the order reception record 70R in Act 507. Here, the processor 501 skips the processes of Act 531 to Act 534 in FIG. 17.

Generally, transfer of the order management server 50 is performed in a state in which a program used to control process routines in FIG. 16 and FIG. 17 is stored in the main memory 502 or the auxiliary storage device 503. However, the transfer is not limited thereto, and there may be a case where the transfer is performed in a state in which the program is not stored in the main memory 502 or the auxiliary storage device 503. Furthermore, here, a program which is transferred separately from the order management server 50 is written in a writable device included in the order management server 50 according to an operation performed by a user. It is possible to perform the transfer of the program by recording the program in the removable recording medium or by performing communication through the network. Any type of recording medium may be used if it is possible to store the program and to be read by an apparatus as in a CD-ROM or a memory card. In addition, a function, which is acquired by installing or downloading the program, may be realized in cooperation with an Operating System (OS) or the like in the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An order management system comprising:
    an ordering terminal configured to:
        generate order data of an order for food to be cooked based on user inputs and transmit the order data over a network, and
        in response to user inputs, transmit a seat leaving command and a seat ID corresponding to one or more assigned seats over the network;
    a checkout terminal configured to process payment for the order;
    a server configured to:
        generate an order file including an order ID based on the order data transmitted from the ordering terminal,
        transmit checkout data including data in the order file to the checkout terminal over the network, in response to the order ID received from the checkout terminal,
        transmit seat data indicating a vacant seat status for seat selection over the network, in response to payment completion data associated with the order ID from the checkout terminal,
        transmit a cook start command for the order over the network, in response to assignment of one or more vacant seats to one or more customers associated with the order ID, and
        update the seat data based on the seat leaving command and the seat ID received from the ordering terminal; and
    a kitchen terminal configured to generate a cook start notification for the order based on the cook start command received from the server.

2. The order management system according to claim 1, wherein the server is further configured to transmit the order data to the kitchen terminal over the network upon receiving the order data from the ordering terminal, the order data being transmitted to the kitchen terminal separately from and in advance to the cook start command.

3. The order management system according to claim 1, wherein
    the server is further configured to transmit the order ID to the ordering terminal over the network in response to the order data from the ordering terminal, and
    the ordering terminal is further configured to generate a print command to print an order slip including an optically-readable code indicating the order ID.

4. The order management system according to claim 3, wherein the checkout terminal is configured to read the optically-readable code from the order slip to obtain the order ID, and process the payment for the order based on the obtained order ID.

5. The order management system according to claim 1, wherein
    the checkout terminal is further configured to generate additional order data of an additional order for food to be cooked associated with the order based on user inputs, and transmit the order data to the server over the network, and
    the server is further configured to update the order file to include the additional order data, in response to the additional order data transmitted from the checkout terminal.

6. The order management system according to claim 5, wherein the server is further configured to transmit the additional order data to the kitchen terminal over the network upon receiving the additional order data from the checkout terminal, the additional order data being transmitted to the kitchen terminal separately from and in advance to the cook start command.

7. The order management system according to claim 1, wherein
    the checkout terminal is further configured to generate a graphical user interface to present one or more vacant seats and receive a seat selection, and transmit the seat selection to the server over the network, and
    the server is further configured to perform a seat assignment based on the seat selection received from the checkout terminal.

8. The order management system according to claim 7, wherein the graphical user interface includes a seat map and a selectable object positioned at each of one or more vacant seats in the seat map.

9. The order management system according to claim 1, wherein
the ordering terminal is further configured to generate a graphical user interface to present one or more vacant seats and receive a seat selection, and transmit the seat selection to the server over the network, and
the server is further configured to perform a seat assignment based on the seat selection received from the ordering terminal.

10. The order management system according to claim 1, wherein the ordering terminal is a mobile computing device of a customer.

11. A method for order communication comprising:
generating, at an ordering terminal, order data of an order for food to be cooked based on user inputs and transmitting the order data from the ordering terminal to a server over a network;
generating, at the server, an order file including an order ID based on the order data transmitted from the ordering terminal,
transmitting checkout data including data in the order file from the server to a checkout terminal over the network, in response to the order ID received from the checkout terminal,
processing, by the checkout terminal, payment for the order;
transmitting seat data indicating a vacant seat status for seat selection from the server over the network, in response to payment completion data associated with the order ID from the checkout terminal;
transmitting a cook start command for the order from the server to a kitchen terminal over the network, in response to assignment of one or more vacant seats to one or more customers associated with the order ID;
generating, at the kitchen terminal, a cook start notification for the order based on the cook start command received from the server;
transmitting a seat leaving command and a seat ID of each of one or more assigned seats from the ordering terminal, over the network; and
updating, at the server, the seat data based on the seat leaving command and the seat ID received from the ordering terminal.

12. The method according to claim 11, further comprising:
transmitting the order data from the server to the kitchen terminal over the network upon receiving the order data from the ordering terminal, the order data being transmitted to the kitchen terminal separately from and in advance to the cook start command.

13. The method according to claim 11, further comprising:
transmitting the order ID from the server to the ordering terminal over the network in response to the order data from the ordering terminal; and
generating, at the ordering terminal, a print command to print an order slip including an optically-readable code indicating the order ID.

14. The method according to claim 13, further comprising:
reading, at the checkout terminal, the optically-readable code from the order slip to obtain the order ID, wherein the payment for the order is processed based on the obtained order ID.

15. The method according to claim 11, further comprising:
generating, at the checkout terminal, additional order data of an additional order for food to be cooked associated with the order based on user inputs, and transmitting the order data from the checkout terminal to the server over the network; and
updating, at the server, the order file to include the additional order data, in response to the additional order data transmitted from the checkout terminal.

16. The method according to claim 15, further comprising:
transmitting the additional order data from the server to the kitchen terminal over the network upon receiving the additional order data from the checkout terminal, the additional order data being transmitted to the kitchen terminal separately from and in advance to the cook start command.

17. The method according to claim 11, further comprising:
generating, at the checkout terminal, a graphical user interface to present one or more vacant seats and receive a seat selection, and transmitting the seat selection from the checkout terminal to the server over the network; and
performing, by the server, a seat assignment based on the seat selection received from the checkout terminal.

18. The method according to claim 17, wherein the graphical user interface includes a seat map and a selectable object positioned at each of one or more vacant seats in the seat map.

19. The method according to claim 11, further comprising:
generating, at the ordering terminal, a graphical user interface to present one or more vacant seats and receive a seat selection, and transmitting the seat selection from the ordering terminal to the server over the network; and
performing, by the server, a seat assignment based on the seat selection received from the ordering terminal.

20. The method according to claim 11, wherein the ordering terminal is a mobile computing device of a customer.

* * * * *